(12) United States Patent
Masuda et al.

(10) Patent No.: US 12,441,902 B2
(45) Date of Patent: Oct. 14, 2025

(54) INK SET, IMAGE FORMING METHOD, AND IMAGE FORMING APPARATUS

(71) Applicants: Kiminori Masuda, Tokyo (JP); Hiroaki Takahashi, Kanagawa (JP); Masaki Kudo, Kanagawa (JP)

(72) Inventors: Kiminori Masuda, Tokyo (JP); Hiroaki Takahashi, Kanagawa (JP); Masaki Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 18/352,524

(22) Filed: Jul. 14, 2023

(65) Prior Publication Data

US 2024/0026180 A1    Jan. 25, 2024

(30) Foreign Application Priority Data

Jul. 19, 2022    (JP) .................................. 2022-114801

(51) Int. Cl.

| | |
|---|---|
| C09D 11/40 | (2014.01) |
| B41M 5/00 | (2006.01) |
| C08K 5/053 | (2006.01) |
| C08K 5/098 | (2006.01) |
| C09D 11/023 | (2014.01) |
| C09D 11/102 | (2014.01) |
| C09D 11/107 | (2014.01) |
| C09D 11/322 | (2014.01) |
| C09D 11/36 | (2014.01) |
| C09D 11/38 | (2014.01) |
| C09D 11/54 | (2014.01) |

(52) U.S. Cl.
CPC .......... *C09D 11/40* (2013.01); *B41M 5/0017* (2013.01); *C08K 5/053* (2013.01); *C08K 5/098* (2013.01); *C09D 11/023* (2013.01); *C09D 11/102* (2013.01); *C09D 11/107* (2013.01); *C09D 11/322* (2013.01); *C09D 11/36* (2013.01); *C09D 11/38* (2013.01); *C09D 11/54* (2013.01)

(58) Field of Classification Search
CPC ..... C09D 11/40; C09D 11/023; C09D 11/102; C09D 11/107; C09D 11/322; C09D 11/36; C09D 11/38; C09D 11/54; B41M 5/0017; B41M 5/00; C08K 5/053; C08K 5/098
See application file for complete search history.

(56) References Cited

U.S. PATENT DOCUMENTS

| | | |
|---|---|---|
| 2015/0191614 A1 | 7/2015 | Nagashima et al. |
| 2018/0208783 A1 | 7/2018 | Takahashi et al. |
| 2019/0381810 A1 | 12/2019 | Takahashi et al. |
| 2019/0381811 A1 | 12/2019 | Masuda et al. |
| 2020/0016898 A1 | 1/2020 | Sagara et al. |

(Continued)

FOREIGN PATENT DOCUMENTS

| | | |
|---|---|---|
| JP | 2013-212644 | 10/2013 |
| JP | 2015-147919 | 8/2015 |

(Continued)

*Primary Examiner* — Bradley W Thies
(74) *Attorney, Agent, or Firm* — Grüneberg and Myers PLLC

(57) ABSTRACT

An ink set is provided that includes a pretreatment liquid containing a resin (R1), a color ink containing a resin (R2), and a clear ink containing a resin (R3), in which the resin (R1), the resin (R2), and the resin (R3) have an identical type of bonding structure in a repeating unit of a molecule.

12 Claims, 2 Drawing Sheets

(56) References Cited

U.S. PATENT DOCUMENTS

| | | | |
|---|---|---|---|
| 2020/0157366 A1* | 5/2020 | Gotou | C09D 11/36 |
| 2020/0171832 A1 | 6/2020 | Akima et al. | |
| 2020/0171839 A1 | 6/2020 | Takahashi et al. | |
| 2020/0316945 A1 | 10/2020 | Tanioku et al. | |
| 2020/0354597 A1 | 11/2020 | Takahashi et al. | |
| 2020/0399496 A1 | 12/2020 | Nonaka et al. | |
| 2021/0155012 A1 | 5/2021 | Gotou et al. | |
| 2021/0170778 A1 | 6/2021 | Takahashi et al. | |
| 2021/0237468 A1 | 8/2021 | Takahashi et al. | |
| 2021/0301156 A1 | 9/2021 | Hirade et al. | |
| 2021/0362503 A1 | 11/2021 | Akima et al. | |
| 2021/0363369 A1 | 11/2021 | Akima et al. | |
| 2022/0024220 A1 | 1/2022 | Kudo et al. | |
| 2022/0298372 A1 | 9/2022 | Shimura et al. | |
| 2022/0363063 A1 | 11/2022 | Masuda et al. | |
| 2022/0363927 A1 | 11/2022 | Takahashi et al. | |
| 2022/0389258 A1 | 12/2022 | Takahashi et al. | |
| 2022/0403192 A1 | 12/2022 | Kudo et al. | |

FOREIGN PATENT DOCUMENTS

| | | |
|---|---|---|
| JP | 2015-217591 | 12/2015 |
| JP | 2016-163986 | 9/2016 |
| JP | 2019-038117 | 3/2019 |
| JP | 2019-147307 | 9/2019 |
| JP | 2020-179520 | 11/2020 |
| JP | 2021-000790 | 1/2021 |
| JP | 2021-120219 | 8/2021 |
| JP | 2022-025538 | 2/2022 |

\* cited by examiner

INK SET, IMAGE FORMING METHOD, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-114801, filed on Jul. 19, 2022, in the Japan Patent Office, the entire disclosure of which is hereby incorporated by reference herein.

BACKGROUND

Technical Field

The present disclosure relates to an ink set, an image forming method, and an image forming apparatus.

Related Art

To improve the durability such as light resistance, water resistance, and wear resistance in industrial applications such as advertisements and billboards, as well as packaging materials for food, beverages, daily necessities, and the like, impermeable recording media such as plastic films are used as recording media, and various types of ink have been developed to be used in such impermeable recording media.

For example, solvent-based ink using an organic solvent as a solvent, ultraviolet-curable ink including a polymerizable monomer as a main component, and water-based ink that is less harmful to the environment and can be used to directly record on an impermeable recording medium, are widely used as these types of ink.

SUMMARY

An ink set according to an embodiment of the present invention is an ink set including a pretreatment liquid containing a resin (R1), a color ink containing a resin (R2), and a clear ink containing a resin (R3), in which the resin (R1), the resin (R2), and the resin (R3) have an identical type of bonding structure in a repeating unit of a molecule.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
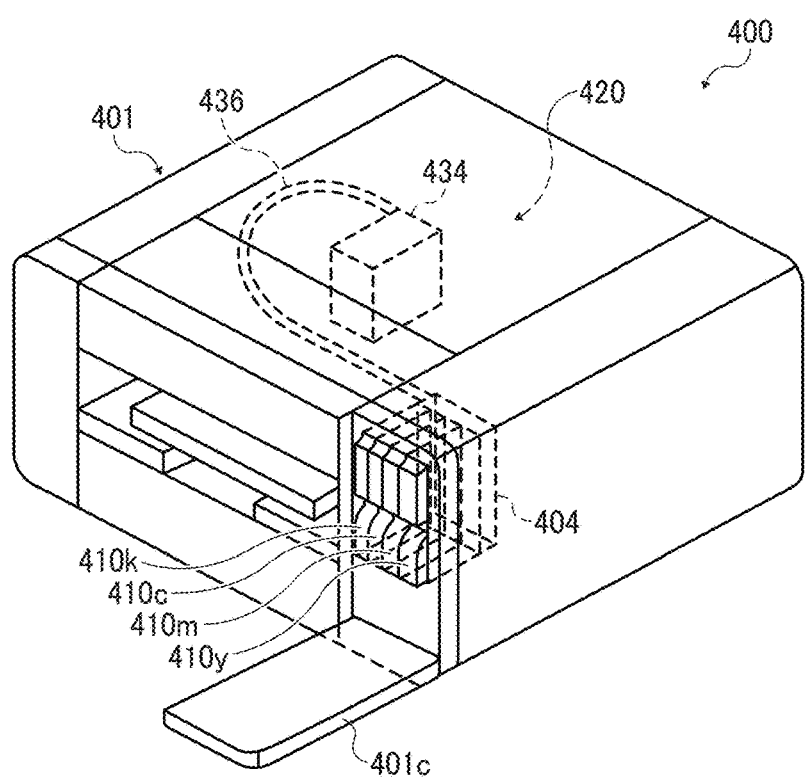
FIG. 1 is a perspective explanatory view generally illustrating an example of an image forming apparatus according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present invention, an ink set is provided that has excellent adhesiveness to an impermeable base material and excellent abrasion resistance.

In general, for a solvent-based ink, there is concern over environmental impact due to evaporation of the organic solvent. Further, in the case of an ultraviolet curable ink, the choice of polymerizable monomers is limited from the viewpoint of safety, and there are problems in the use of ultraviolet curable ink indoor, because of its unpleasant smell. To reduce the environmental impact, a water-based ink has been proposed that allows for direct recording on a permeable recording medium. However, in the technology of the related art, even though the abrasion resistance is improved, it is not possible to impart sufficient abrasion resistance against various obstacles in practical use, and the adhesiveness of the ink to a base material is also insufficient.

As a result of extensive studies, the inventors have found that an image having excellent adhesiveness to an impermeable base material and excellent abrasion resistance can be formed by using an ink set in which a resin contained in a pretreatment liquid, a resin contained in color ink, and a resin contained in clear ink have an identical type of bonding structure in a repeating unit of a molecule.

Therefore, according to an embodiment of the present invention, an ink set that includes a pretreatment liquid containing a resin (R1), a color ink containing a resin (R2), and a clear ink containing a resin (R3) is provided, in which the resin (R1), the resin (R2), and the resin (R3) have an identical type of bonding structure in a repeating unit of a molecule, so that the ink set has excellent adhesiveness to an impermeable base material and excellent abrasion resistance.

Embodiments of the present invention will be described in detail below.

(Ink Set for Impermeable Base Material)

Herein, the "ink set for an impermeable base material" may be simply referred to as "ink set".

The ink set of the present embodiment is an ink set for an impermeable base material and includes a pretreatment liquid containing a resin (R1), a color ink containing a resin (R2), and a clear ink containing a resin (R3), in which the resin (R1), the resin (R2), and the resin (R3) have an identical type of bonding structure in a repeating unit of a molecule. The ink set may include other components, as desired.

Herein, the terms "color ink" and "clear ink" may be collectively referred to as "ink".

Herein, the expression "have an identical type of bonding structure in a repeating unit of a molecule" means that the types of bonding structures in the repeating unit of the molecules forming the resins are identical. For example, the bonding structure includes a urethane bond ($-NH-CO_2$), an ester bond (—COO—), an acryloyl group (H$_2$C═CH—C(═O)—), a methacryloyl group, and other bonding structures. More specifically, a resin in which the bonding structure in the repeating unit of the molecules is a urethane bond is classified as a urethane resin, for example, and a resin in which the bonding structure in the repeating unit of the molecules is an acryloyl group is classified as an acrylic resin.

A polymer forming the resin may include a linear polymer (straight-chain polymer) or a branched polymer having a side chain as a branched structure. The branched polymer is not particularly limited, and may be a graft polymer in which other monomers or polymers are bonded as side chains to a main chain of the polymer, or may be a hyperbranched polymer having multiple branches. The other monomers and polymers are not particularly limited and may be appropriately selected according to a purpose. Herein, the term "main chain" refers to the longest straight chain in a polymer, and the term "side chain" refers to a molecular chain other than the main chain. If branched polymer chains in the branched polymer have the same length, either one may be the main chain (or the side chain).

Herein, if the polymer forming the resin is a branched polymer, the type of the resin is determined based on the bonding structure of the repeating unit in the main chain, without considering the bonding structure of the repeating unit in the side chain.

Herein, if there is a plurality of types of bonding structures included in the repeating unit in the main chain of the polymer forming the resin, the type of the resin is determined based on the most frequent bonding structure among the bonding structures included in the repeating unit. For example, if there are two urethane bonds (—NH—CO$_2$) and one acryloyl group (H$_2$C═CH—C(═O)—) in the repeating unit, it is determined that the resin is a urethane resin, not an acrylic resin. If there is a plurality of types of "most frequent bonding structures among the bonding structures included in the repeating unit", the type of the resin is determined based on the alphabetical order (ascending order) of the first letters in the English notation of the bonding structures. For example, if there are two urethane bonds and two acryloyl groups in the repeating unit, the type of the resin is determined based on the first letters in the English notation, and because "acryloyl group" is first in the alphabetical order, the resin is classified as an acrylic resin. If the first letters in the English notation of bonding structures are the same, the type of the resin is determined based on the alphabetical order (ascending order) of the second letters of the bonding structures, and if the first letters and the second letters are the same, the type of the resin is determined based on the alphabetical order (ascending order) of the third letters of the bonding structures. The type of the resin is similarly determined based on the fourth and subsequent letters.

For example, $^1$H-NMR, $^{13}$C-NMR, and gas chromatography may be used to analyze whether the resin (R1), the resin (R2), and the resin (R3) have an identical type of bonding structure in the repeating unit of the molecules.

<Clear Ink>

The clear ink in the present embodiment contains the resin (R3) and may contain other components (I3) if desired. Herein, the term "clear ink" refers to colorless, transparent ink that substantially does not contain a color material. The term "aqueous clear ink" as used herein refers to clear ink containing water as a solvent, and the aqueous clear ink may contain an organic solvent as a solvent.

<<Resin (R3)>>

The type of the resin (R3) contained in the clear ink of the present embodiment is not particularly limited and may be appropriately selected according to a purpose. Examples of the resin (R3) include, but are not limited to, urethane resins, ester resins, acrylic resins, vinyl acetate-based resins, styrene resins, butadiene resins, styrene-butadiene resins, vinyl chloride resins, acrylic styrene resins, and acrylic silicone resins.

When manufacturing the ink, it is preferable to add resin particles formed of these resins.

The resin particles may be added to the ink in the form of a resin emulsion dispersed in water as a dispersion medium.

The resin (R3) preferably includes two types of resin particles, resin particles (A) and resin particles (B).

The glass transition temperature (Tg) of the resin particles (A) is preferably 50° C. or higher, and more preferably 50° C. or higher and lower than 100° C. The Tg of the resin particles (A) is preferably 50° C. or higher, because in this case, a coating film formed by the clear ink (may be referred to as a clear ink coating film hereinafter) is toughened, and the abrasion resistance of an image is improved.

The glass transition temperature (Tg) of the resin particles (B) is preferably less than and more preferably −50° C. or higher and lower than 0° C. The Tg of the resin particles (B) is preferably lower than 0° C., because in this case, the adhesiveness between the clear ink and a color ink coating film forming a base for the clear ink is improved, and as a result, the abrasion resistance of the clear ink coating film is improved.

A mass ratio (MA:MB) between a mass MA (mg) of the resin particles (A) and a mass MB (mg) of the resin particles (B) is preferably from 98:2 to 80:20, from the viewpoint of ensuring both abrasion resistance and adhesiveness. In other words, the content of the resin particles (A) is preferably higher than the content of the resin particles (B).

The total proportion (solid content) of the resin (R3) particles contained in the clear ink is preferably 10% by mass or more, with respect to the total amount of the clear ink, and more preferably 10% by mass or more and 25% by mass or less from the viewpoint of excellent abrasion resistance and discharge stability of the ink. The total proportion (solid content) of the resin (R3) particles is preferably 10% by mass or more with respect to the total amount of the clear ink, so that the abrasion resistance is further improved.

The shape of the resin (R3) particles may be appropriately selected according to a purpose, and may be a fixed shape or an irregular shape. Preferably, the shape is a fixed shape.

If the resin (R3) particles have a fixed shape, it is preferable that the shape is a spherical shape.

If the shape of the resin (R3) particles is a spherical shape, the resin (R3) preferably include particles.

The volume average particle diameter of the resin (R3) particles is preferably 50 nm or less, and more preferably 10 nm or more and 50 nm or less. When the volume average particle diameter of the resin (R3) particles is 50 nm or less, it is possible to form a uniform clear ink coating film. A lower limit of the volume average particle diameter of the resin (R3) particles is at least 5 nm or more.

For example, the volume average particle diameter of the resin (R3) particles can be measured by using a particle size analyzer (NANOTRAC WAVE II, manufactured by MicrotracBEL Corp.).

The resin particles may be appropriately synthesized or may be a commercially available product. These resin particles may be used alone, or two or more types of resin particles may be used in combination.

The resin (R3) in the present embodiment is preferably a urethane resin. If the resin (R3) contains two types of resin particles, such as the resin particles (A) and the resin particles (B), it is preferable that at least the resin particles (A) or the resin particles (B) include urethane resin particles.

<<<Urethane Resin>>>

If the resin (R3) in the present embodiment is a urethane resin, the clear ink coating film is toughened when the clear ink coating film is formed. As a result, if the clear ink coating film is broken on the inside, it is easier to suppress peeling of a part of the coating film and a color change of a friction part due to a change in a surface condition of the coating film, and thus, the urethane resin is preferable.

The term "urethane resin" as used herein refers to a resin in which the most frequent bonding structure among the bonding structures included in the repeating unit in the main chain of the polymer forming the resin is a urethane bond. The urethane resin is obtained in a reaction between a polyol and a polyisocyanate, for example. Examples of characteristics exhibiting by the urethane resin include, but are not limited to, performances of a soft segment including a polyol component having a weak cohesive force and a hard segment including an urethane bond having a strong cohesive force. The soft segment is flexible and resistant to deformation of a base material, such as drawing and bending of the base material. The hard segment has high adhesiveness to the base material and excellent wear resistance.

The urethane resin is not particularly limited and may be appropriately selected according to a purpose. Examples of the urethane resin include, but are not limited to, polyether-based urethane resins, polycarbonate-based urethane resins, and polyester-based urethane resins.

—Polyols Used to Produce Urethane Resin—

Examples of polyols used to produce the urethane resin include, but are not limited to, polyether polyols, polycarbonate polyols, and polyester polyols. Each of these polyols may be used alone or in combination with others.

——Polyether Polyol——

Examples of the polyether polyols include, but are not limited to, polyether polyols obtained by an addition polymerization of an alkylene oxide with at least one type of compound having two or more active hydrogen atoms, as a starting material.

———Compound Having Two or More Active Hydrogen Atoms———

Examples of the compound having two or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. Each of these compounds may be used alone or in combination with others.

———Alkylene Oxide———

Examples of the alkylene oxide include, but are not limited to, ethylene oxide, propylene oxide, butylene oxide, styrene oxide, epichlorohydrin, and tetrahydrofuran. Each of these alkylene oxides may be used alone or in combination with others.

The polyether polyol is not particularly limited and may be appropriately selected according to a purpose. However, polyoxytetramethylene glycol and polyoxypropylene glycol are preferred from the viewpoint of obtaining an ink binder that imparts excellent abrasion resistance. Each of these polyether polyols may be used alone or in combination with others.

——Polycarbonate Polyol——

Examples of the polycarbonate polyol include polycarbonate polyols obtained in a reaction between a carbonic acid ester and a polyol, and polycarbonate polyols obtained in a reaction between phosgene and bisphenol A. Each of these polycarbonate polyols may be used alone or in combination with others.

———Carbonic Acid Ester———

Examples of the carbonic acid ester include, but are not limited to, methyl carbonate, dimethyl carbonate, ethyl carbonate, diethyl carbonate, cyclocarbonates, and diphenyl carbonate. Each of these carbonic acid esters may be used alone or in combination with others.

———Polyols Used to Produce Polycarbonate Polyol———

Polyols used to produce the polycarbonate polyol include, but are not limited to, dihydroxy compounds having relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol-A, bisphenol-F, and 4,4'-biphenol; polyether polyols such as polyethylene glycol, polypropylene glycol, and polyoxytetramethylene glycol; and polyester polyols such as polyhexamethylene adipate, polyhexamethylene succinate, and polycaprolactone. Each of these polycarbonate polyols may be used alone or in combination with others.

——Polyester Polyol——

Examples of the polyester polyol include, but are not limited to, polyester polyols obtained by an esterification reaction between a polycarboxylic acid and a polyol having a low molecular weight, polyesters obtained by a ring-opening polymerization reaction of a cyclic ester compound such as ε-caprolactone, and copolymer polyesters of these reaction products. Each of these polyester polyols may be used alone or in combination with others.

———Polyol Having Low Molecular Weight———

Examples of the polyol having a low molecular weight include, but are not limited to, ethylene glycol and propylene glycol. Each of these polyols may be used alone or in combination with others.

———Polycarboxylic Acid———

Examples of the polycarboxylic acid include, but are not limited to, succinic acid, adipic acid, sebacic acid, dodecanedicarboxylic acid, terephthalic acid, isophthalic acid, phthalic acid, and anhydrides and ester-forming derivatives thereof. Each of these may be used alone or in combination with others.

—Polyisocyanate—

Examples of the polyisocyanate include, but are not limited to, aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. Each of these polyisocyanates may be used alone or in combination with others.

Among these polyisocyanates, alicyclic diisocyanates are preferable, because it is easier to obtain a desired coating film strength and abrasion resistance and improve the weather resistance when alicyclic diisocyanates are used.

Examples of the alicyclic diisocyanates include, but are not limited to, isophorone diisocyanate and dicyclohexylmethane diisocyanate.

The proportion of the alicyclic diisocyanate is preferably 60% by mass or more with respect to the total amount of the isocyanate compounds.

[Method of Manufacturing Urethane Resin]

The method of manufacturing the urethane resin is not particularly limited and the urethane resin may be obtained by a commonly used manufacturing method. Examples of the method include, but are not limited to, the following method.

First, under conditions including no solvent or including an organic solvent, the polyol and the polyisocyanate are caused to react at an equivalent ratio at which the isocyanate groups are obtained in excess, to manufacture a urethane prepolymer having an isocyanate end.

Subsequently, anionic groups in the urethane prepolymer having an isocyanate end are neutralized by using a neutralizing agent, if desired, and then, the urethane prepolymer is caused to react with a chain extender. After that, if desired, the urethane resin may be obtained by removing the organic solvent in the system.

Examples of the organic solvent that may be used in producing the urethane resin include, but are not limited to, ketones such as acetone and methyl ethyl ketone; ethers such as tetrahydrofuran and dioxane; acetic esters such as ethyl acetate and butyl acetate; nitriles such as acetonitrile; and amides such as dimethylformamide, N-methylpyrrolidone, and N-ethylpyrrolidone.

Each of these organic solvents may be used alone or in combination with others. Examples of the chain extender include, but are not limited to, polyamines and other compounds having an active hydrogen group.

—Polyamine—

Examples of the polyamines include, but are not limited to, diamines such as ethylenediamine, 1,2-propanediamine, 1,6-hexamethylenediamine, piperazine, 2,5-dimethylpiperazine, isophoronediamine, 4,4'-dicyclohexylmethanediamine, and 1,4-cyclohexanediamine; polyamines such as diethylenetriamine, dipropylenetriamine, and triethylenetetramine; hydrazines such as hydrazine, N,N'-dimethylhydrazine, and 1,6-hexamethylenebishydrazine; and dihydrazides such as succinic dihydrazide, adipic dihydrazide, glutaric dihydrazide, sebacic dihydrazide, and isophthalic dihydrazide. Each of these polyamines may be used alone or in combination with others.

—Other Compounds Having Active Hydrogen Groups—

Examples of the other compounds having an active hydrogen group include, but are not limited to, glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. Each of these compounds may be used alone or in combination with others, as long as the storage stability of the ink does not deteriorate.

As the urethane resin, a polycarbonate-based urethane resin is preferable, because the carbonate group has a high cohesive force that achieves water resistance, heat resistance, wear resistance, weather resistance, and abrasion resistance of the image. If the polycarbonate-based urethane resin is used as the urethane resin, it is possible to obtain an ink suitable for a recording material used in harsh environments such as outdoor applications.

The urethane resin may be appropriately synthesized or may be a commercially available product.

Examples of the urethane resin include, but are not limited to, UCOAT UX-485 (polycarbonate-based polyurethane resin), UCOAT UWS-145 (polyester-based polyurethane resin), PERMARIN UA-368T (polycarbonate-based urethane resin), and PERMARIN UA-200 (polyether-based urethane resin) (all manufactured by Sanyo Chemical Industries, Ltd.). Each of these urethane resins may be used alone or in combination with others.

<<<Acrylic Resin>>>

The term "acrylic resin" in the present embodiment refers to a resin in which the most frequent bonding structure among the bonding structures included in the repeating unit in the main chain of the polymer forming the resin is an acrylic group. The acrylic resin may be obtained by polymerizing an acrylic monomer, for example.

The acrylic monomer is not particularly limited and may be appropriately selected according to a purpose. Examples of the acrylic monomer include, but are not limited to, acrylic acid ethyl ester and acrylamide.

The acrylic resin may be appropriately synthesized or may be a commercially available product.

Commercially available products of the acrylic resin include, but are not limited to, resins by the trade names of MOWINYL 6940 (manufactured by Japan Coating Resin Co., Ltd., Tg: −2° C.) and MOWINYL 6951 (manufactured by Japan Coating Resin Co., Ltd., Tg: −25° C.).

<<Other Components (I3)>>

The other components (I3) are not particularly limited and may be appropriately selected according to a purpose. Examples thereof include, but are not limited to, water, surfactants, organic solvents, defoaming agents, preservatives and fungicides, rust inhibitors, and pH adjusters. Among these, surfactants are preferred.

<<<Water>>>

The type of water is not particularly limited and may be suitably selected according to a purpose. Examples of the water include, but are not limited to, pure water and ultrapure water such as ion-exchanged water, ultrafiltration water, reverse osmosis water, and distilled water. Each of these may be used alone or in combination with others.

The water content is preferably 15% by mass or more and 60% by mass or less with respect to the total amount of clear ink. If the water content is 15% by mass or more with respect to the total amount of the clear ink, it is possible to prevent an increase in the viscosity of the clear ink and improve the discharge stability. On the other hand, if the water content is 60% by mass or less with respect to the total amount of the clear ink, the wettability with respect to an impermeable base material is good, and it is possible to improve the image quality.

<<<Surfactant>>>

If the clear ink includes a surfactant, the surface tension of the clear ink decreases, the wettability with respect to the impermeable base material is good, and it is possible to improve the image quality. Further, if a later-described recording medium is used as a material to be printed, ink droplets penetrate into the recording medium faster after landing, and thus, it is possible to reduce feathering and color bleeding.

The surfactants are classified into nonionic surfactants, anionic surfactants, and amphoteric surfactants according to the polarity of the hydrophilic group. Further, the surfactants are classified into fluorine-based surfactants, silicone-based surfactants, acetylene-based surfactants, and the like according to the structure of the hydrophobic group.

In the present embodiment, a fluorine-based surfactant is mainly used, but a silicone-based surfactant and an acetylene-based surfactant may also be used.

Surfactants that may be used include silicone-based surfactants, fluorine-based surfactants, amphoteric surfactants, nonionic surfactants, and anionic surfactants.

—Silicone-based Surfactant—

The silicone-based surfactant is not particularly limited and may be appropriately selected according to a purpose, but it is preferable to use a silicone-based surfactant that does not decompose even at high pH (pH 11 to 14).

Examples of the silicone-based surfactant that does not decompose even at high pH (pH 11 to 14) include, but are not limited to, polydimethylsiloxane modified in a side chain, polydimethylsiloxane modified at both ends, polydimethylsiloxane modified at one end, and polydimethylsiloxane modified in a side chain and at both ends. Among these silicone-based surfactants, a silicone-based surfactant having a polyoxyethylene group or a polyoxyethylene polyoxypropylene group as a modified group is preferable from the viewpoint of improving hydrophilicity and increasing solubility in water.

A polyether-modified silicone-based surfactant can also be used as the silicone-based surfactant. Examples of the polyether-modified silicone-based surfactant further include, but are not limited to, a compound in which a polyalkylene oxide structure is introduced into the side chain of a Si-part in dimethylsiloxane.

The polyether-modified silicone-based surfactant is not particularly limited and may be appropriately selected according to purpose. Examples of the polyether-modified silicone-based surfactant include, but are not limited to, a compound represented by General Formula (S-1) below in which a polyalkylene oxide structure is introduced into the side chain of the Si-part in dimethylpolysiloxane.

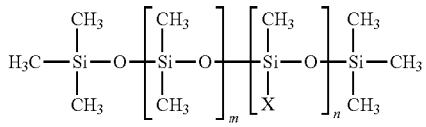

$X = \text{—} R(C_2H_4O)_a (C_3H_5)_b R'$

General Formula (S-1)

(in General formula (S-1), each of m, n, a, and b in the formula independently represent an integer, R represents an alkylene group, and R' represents an alkyl group.)

The silicone-based surfactant may be appropriately synthesized or may be a commercially available product.

For example, commercially available products of the silicone-based surfactant are readily available from BYK-Chemie Co., Ltd., Shin-Etsu Chemical Co., Ltd., Dow Corning Toray Silicone Co., Ltd., Nihon Emulsion Co., Ltd., and Kyoeisha Chemical Co., Ltd.

Examples of commercially available products of the polyether-modified silicone-based surfactant include, but are not limited to, KF-618, KF-642, KF-643 (all manufactured by Shin-Etsu Chemical Co., Ltd.), EMALEX-SS-5602, SS-1906EX (both manufactured by Nihon Emulsion Co., Ltd.), DOWSIL (registered trademark) FZ-2105, DOWSIL (registered trademark) FZ-2118, DOWSIL (registered trademark) FZ-2154, DOWSIL (registered trademark) FZ-2161, DOWSIL (registered trademark) FZ-2162, DOWSIL (registered trademark) FZ-2163, DOWSIL (registered trademark) FZ-2164 (all manufactured by Dow Corning Toray Silicone Co., Ltd.), BYK-33, BYK-387 (both manufactured by BYK-Chemie Co., Ltd.), TSF4440, TSF4452, and TSF4453 (all manufactured by Momentive Performance Materials Japan LLC).

—Fluorine-Based Surfactant—

The fluorine-based surfactant is not particularly limited and may be appropriately selected according to a purpose, but is preferably a compound having 2 to 16 fluorine-substituted carbon atoms, and more preferably a compound having 4 to 16 fluorine-substituted carbon atoms.

Examples of the fluorine-based surfactant include, but are not limited to, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having a perfluoroalkyl ether group in a side chain.

Examples of the perfluoroalkyl sulfonic acid compounds include, but are not limited to, perfluoroalkyl sulfonic acids and perfluoroalkyl sulfonates.

Examples of the perfluoroalkyl carboxylic acid compounds include, but are not limited to, perfluoroalkyl carboxylic acids and perfluoroalkyl carboxylates.

Examples of the polyoxyalkylene ether polymer compounds having a perfluoroalkyl ether group in a side chain include, but are not limited to, sulfuric ester salts of polyoxyalkylene ether polymers having a perfluoroalkyl ether group in a side chain, and salts of polyoxyalkylene ether polymers having a perfluoroalkyl ether group in a side chain.

Among these, polyoxyalkylene ether polymer compounds having a perfluoroalkyl ether group in a side chain are preferred, because these compounds have a low foaming property, and fluorine-based surfactants represented by General Formula (F-1) and General Formula (F-2) below are more preferred.

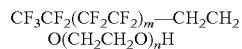

General Formula (F-1)

In the compound represented by General Formula (F-1) above, m is preferably an integer from 0 to 10 and n is preferably an integer from 0 to 40, from the viewpoint of imparting water-solubility.

General Formula (F-2)

In the compound represented by General Formula (F-2) above, Y represents H, or $C_mF_{2m+1}$ (m being an integer from 1 to 6), or $CH_2CH(OH)CH_2$—$C_mF_{2m+1}$ (m being an integer from 4 to 6), or $C_pH_{2p+1}$ (p being an integer from 1 to 19). In the compound, n represents an integer from 1 to 6. Further, a represents an integer from 4 to 14.

Examples of counter ions for the salts in these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

The fluorine-based surfactant may be appropriately synthesized or a commercially available product.

Examples of commercially available products of the fluorine-based surfactant include, but are not limited to, SURFLON S-111, SURFLON S-112, SURFLON S-113, SURFLON S-121, SURFLON S-131, SURFLON S-132, SURFLON S-141, SURFLON S-145 (all manufactured by AGC Co., Ltd.); FLUORAD FC-93, FLUORAD FC-95, FLUORAD FC-98, FLUORAD FC-129, FLUORAD FC-135, FLUORAD FC-170C, FLUORAD FC-430, FLUORAD FC-431 (all manufactured by 3M Japan Co., Ltd.); MEGAFACE F-470, MEGAFACE F-1405, MEGAFACE F-474 (all manufactured by DIC Corporation); ZONYL TBS, FSP, FSA, FSN-100, FSN, FSO-100, FSO, FS-300, UR, CAPSTONE FS-30, CAPSTONE FS-31, CAPSTONE FS-3100, CAPSTONE FS-34, CAPSTONE FS-35 (all manufactured by Chemours Co.); FT-110, FT-250, FT-251, FT-400S, FT-150, FT-400SW (all manufactured by Neos Co., Ltd.), POLYFOX PF-136A, POLYFOX PF-156A, POLYFOX PF-151N, POLYFOX PF-154, POLYFOX PF-159 (all manufactured by Omnova Solutions Inc.), and UNIDYNE DSN-403N (manufactured by Daikin Industries, Ltd.). Among these surfactants, FS-3100, FS-34, and FS-300 manufactured by Chemours Co., FT-110, FT-250, FT-251, FT-400S, FT-150, and FT-400SW manufactured by Neos Co., Ltd., POLYFOX PF-151N manufactured by Omnova Solutions Inc., and UNIDYNE DSN-403N manufactured by Daikin Industries, Ltd. are preferred in terms of good print quality, particularly color development, and remarkably improving permeability to paper, wettability, and dyeing levelness.

—Amphoteric Surfactant—

Examples of the amphoteric surfactants include, but are not limited to, laurylaminopropionate, lauryl dimethyl betaine, stearyl dimethyl betaine, and lauryl dihydroxyethyl betaine.

—Nonionic Surfactant—

Examples of the nonionic surfactants include, but are not limited to, polyoxyethylene alkyl phenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and ethylene oxide adducts of acetylene alcohol.

—Anionic Surfactants—

Examples of the anionic surfactants include, but are not limited to, polyoxyethylene alkyl ether acetate, dodecylbenzene sulfonate, laurates, and polyoxyethylene alkyl ether sulfate.

Each of these anionic surfactants may be used alone or in combination with others.

The proportion of the surfactant is preferably 2% by mass or less with respect to the total amount of the clear ink.

It is preferable that the proportion of the surfactant is 2% by mass or less with respect to the total amount of the clear ink, because in this case, sufficient defoaming properties can be secured.

<<<Organic Solvent>>>

The organic solvent is not particularly limited, may be appropriately selected according to a purpose, and examples thereof include, but are not limited to, a water-soluble organic solvent. The term "water-soluble" means, for example, a property by which 5 g or more of a solvent are dissolved in 100 g of water at 25° C.

Examples of the water-soluble organic solvent include, but are not limited to, polyhydric alcohols such as ethylene glycol, diethylene glycol, 1,2-propanediol, 1,3-propanediol, 1,2-butanediol, 1,3-butanediol, 2,3-butanediol, 3-methyl-1,3-butanediol, 3-methoxy-3-methylbutanol, triethylene glycol, polyethylene glycol, polypropylene glycol, 1,5-pentanediol, 2-methyl-2,4-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monomethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethylamine; sulfur-containing compounds such as dimethylsulfoxide, sulfolane, and thiodiethanol; propylene carbonate, and ethylene carbonate. Each of these solvents may be used alone or in combination with others.

A proportion of the organic solvent in the clear ink is not particularly limited and may be appropriately selected according to a purpose, but is preferably 10% by mass or more and 60% by mass or less, and more preferably 20% by mass or more and 60% by mass or less with respect to the total amount of the clear ink, from the viewpoint of the drying properties and the discharge reliability of the ink.

<<<Defoaming Agent>>>

A surfactant used as one of the other components can also be used as a defoaming agent.

The defoaming agent is not particularly limited, and examples thereof include, but are not limited to, silicone-based defoaming agents, polyether-based defoaming agents, and fatty acid ester-based defoaming agents. Each of these defoaming agents may be used alone or in combination with others. Among these defoaming agents, silicone-based defoaming agents have excellent defoaming ability, and thus are preferred.

<<<Preservative and Fungicide>>>

The preservative and fungicide is not particularly limited and examples thereof include, but are not limited to, 1,2-benzisothiazoline-3-one.

<<<Rust Inhibitor>>>

The rust inhibitor is not particularly limited, and examples thereof include, but are not limited to, acidic sulfites and sodium thiosulfate.

<<<pH Adjuster>>>

The pH adjuster is not particularly limited as long as the pH adjuster adjusts the pH to 7 or higher. Examples of the pH adjuster include, but are not limited to, amines such as diethanolamine and triethanolamine.

[Physical Properties of Clear Ink]

The physical properties of the clear ink in the present embodiment are not particularly limited and may be appropriately selected according to a purpose. For example, the viscosity, the surface tension, and pH are preferably within the following ranges.

The viscosity of the clear ink at 25° C. is preferably 5 mPa s or more and 30 mPa s or less, and more preferably 5 mPa s or more and 25 mPa s or less, from the viewpoint of improving the printing density and the character quality and obtaining good discharge properties. For example, the viscosity may be measured by a rotational viscometer (RE-80L, manufactured by Toki Sangyo Co., Ltd.). Regarding the measurement conditions, the viscosity may be measured at 25° C. with a standard cone rotor (1° 34'×R24), a sample liquid amount of 1.2 mL, a rotation speed of 50 rpm, and a measurement time of 3 minutes.

The surface tension of the clear ink at 25° C. is preferably 35 mN/m or less, and more preferably 32 mN/m or less, so that the clear ink is suitably levelized on an impermeable base material and the drying time of the clear ink is shortened.

The pH of the clear ink is preferably from 7 to 12, and more preferably from 8 to 11, from the viewpoint of preventing corrosion of metal members in contact with liquids.

A dry film obtained by drying the clear ink preferably has a glass transition temperature (Tg) of 50° C. or higher and lower than 0° C., and more preferably a Tg of 50° C. or higher and lower than 100° C. and a Tg of −50° C. or higher and lower than 0° C. The dry film of the clear ink preferably has a Tg of 50° C. or higher and a Tg of lower than 0° C., because in this case, it is possible to further improve the abrasion resistance of the clear ink coating film.

A method for measuring the Tg of the dry film of the clear ink is not particularly limited, and the Tg may be measured by the following method, for example.

<<Method of Measuring Glass Transition Temperature of Dry Film of Clear Ink>>

The glass transition temperature of the dry film of the clear ink may be measured by using a differential scanning calorimeter (TA-60WS and DSC-60, manufactured by Shimadzu Corporation).

First, 4 g of clear ink are placed in a petri dish made of a tetrafluoroethylene/perfluoroalkyl vinyl ether copolymer (PFA) with a diameter of 50 mm and the clear ink is spread evenly and dried at 50° C. for one week. Subsequently, 5.0 mg of the obtained ink film are placed in a sample container made of aluminum, the sample container is placed in a holder unit, and the holder unit is placed in an electric furnace. Next, in a nitrogen atmosphere, the temperature in the furnace is raised from 0° C. to 150° C. at a heating rate of 10° C./min, and then, the temperature is lowered from 150° C. to −80° C. at a cooling rate of 5° C./min. Subsequently, the temperature is again increased to 150° C. at a heating rate of 10° C./min to measure the DSC curve. An analysis program in the DSC-60 system is used to analyze the obtained DSC curve by the midpoint method using an inflection part at the time of the second temperature increase to determine the glass transition temperature (Tg).

[Method of Manufacturing Clear Ink]

The clear ink according to the present embodiment is produced by dispersing or dissolving the above-described components in a water-based medium, and if desired, the mixture is stirred and mixed. A stirrer using normal stirring blades, a magnetic stirrer, a high-speed disperser, or the like may be used to stir and mix the mixture.

<Color Ink>

The color ink in the present embodiment contains the resin (R2) and may contain other components (I2) if desired.

<<Resin (R2)>>

The resin (R2) contained in the color ink of the present embodiment is not particularly limited and may be appropriately selected according to a purpose, as long as the type of the bonding structure in the repeating unit of the molecule is identical to that of the resin (R3) and the resin (R1) described later. Examples of the resin (R2) include, but are not limited to, the resins mentioned under the heading <<Resin (R3)>> above.

Similarly to the resin (R3), the resin (R2) is preferably added in the form of resin particles including these resins.

Similarly to the resin (R3), the resin (R2) is preferably a urethane resin. When the resin (R2) is a urethane resin, it is possible to obtain high adhesiveness to the clear ink coating film and a coating film derived from a pretreatment liquid described below.

The volume average particle diameter of the resin (R2) particles included in the color ink is not particularly limited and may be appropriately selected according to a purpose, but is preferably 10 nm or more and 1000 nm or less, more preferably 10 nm or more and 200 nm or less, and even more preferably 10 nm or more and 100 nm or less, from the viewpoint of achieving good fixability and high image hardness.

For example, the volume average particle diameter of the resin (R2) particles can be measured by using a particle size analyzer (NANOTRAC WAVE II, manufactured by MicrotracBEL Corp.).

The total proportion (solid content) of the resin (R2) particles is not particularly limited and may be appropriately selected according to a purpose, but is preferably 1% by mass or more and 30% by mass or less, and more preferably 5% by mass or more and 20% by mass or less, with respect to the total amount of the color ink, from the viewpoint of fixability and storage stability of the ink.

<<Other Components (I2)>>

The other components (I2) are not particularly limited and may be appropriately selected according to a purpose. Examples of the other components (I2) include, but are not limited to, organic solvents, water, color materials, surfactants, defoaming agents, preservatives and fungicides, rust inhibitors, and pH adjusters. Among these, surfactants are preferred.

The other components (I2) may have a similar composition and proportion as those described under the heading <<Other Components (I3)>> in the section <Clear Ink> above.

<<<Organic Solvent>>>

The organic solvent contained in the color ink may have a composition similar to that described under the heading <<<Organic Solvent>>> in the section <<Other Components (I3)>> above.

The proportion of the organic solvent included in the color ink is not particularly limited and may be appropriately selected according to a purpose, but is preferably 10% by mass or more and 60% by mass or less, and more preferably 20% by mass or more and 60% by mass or less with respect to the total amount of the color ink, from the viewpoint of the drying properties and the discharge reliability of the ink.

<<<Water>>>

The water contained in the color ink may have a composition similar to that described under the heading <<<Water>>> in the section <<Clear Ink>> above.

The proportion of the water contained in the color ink is not particularly limited and may be appropriately selected according to a purpose, but is preferably 10% by mass or more and 90% by mass or less, and more preferably 20% by mass or more and 60% by mass or less with respect to the total amount of the color ink, from the viewpoint of the drying properties and the discharge reliability of the ink.

<<<Color Material>>>

The color material included in the color ink of the present embodiment is not particularly limited, and pigments and dyes may be used as the color material.

The pigments may include inorganic pigments or organic pigments. Each of these types of pigments may be used alone or in combination with others. Mixed crystals may also be used as the pigments.

Examples of the pigments that may be used include, but are not limited to, black pigments, yellow pigments, magenta pigments, cyan pigments, white pigments, green pigments, orange pigments, glossy pigments such as gold and silver, and metallic pigments.

Examples of the inorganic pigments that may be used include, but are not limited to, titanium oxide, iron oxide, calcium carbonate, barium sulfate, aluminum hydroxide, Barium Yellow, Cadmium Red, Chrome Yellow, and carbon blacks prepared by a known method such as a contact method, a furnace method, and a thermal method.

Examples of the organic pigments that may be used include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelates and acid dye chelates), nitro pigments, nitroso pigments, and aniline black. Among these pigments, it is preferable to use pigments having good affinity with solvents. In addition, it is also possible to use hollow resin particles or hollow inorganic particles.

Specific examples of black color pigments include, but are not limited to, carbon blacks (C.I. Pigment Black 7) such as furnace black, lamp black, acetylene black, and channel black, or metals such as copper, iron (C.I. Pigment Black 11), and titanium oxide, and organic pigments such as aniline black (C.I. Pigment Black 1).

Specific examples of color pigments include, but are not limited to, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxide), C.I. Pigment Yellow 53, C.I. Pigment Yellow 55, C.I. Pigment Yellow 74, C.I. Pigment Yellow 81, C.I. Pigment Yellow 83, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 108, C.I. Pigment Yellow 109, C.I. Pigment Yellow 110, C.I. Pigment Yellow 117, C.I. Pigment Yellow 120, C.I. Pigment Yellow 138, C.I. Pigment Yellow 150, C.I. Pigment Yellow 153, C.I. Pigment Yellow 155, C.I. Pigment Yellow 180, C.I. Pigment Yellow 185, C.I. Pigment Yellow 213, C.I. Pigment Orange 5, C.I. Pigment Orange 13, C.I. Pigment Orange 16, C.I. Pigment Orange 17, C.I. Pigment Orange 36, C.I. Pigment Orange 43, C.I. Pigment Orange 51, C.I. Pigment Red 1, C.I. Pigment Red 2, C.I. Pigment Red 3, C.I. Pigment Red 5, C.I. Pigment Red 17, C.I. Pigment Red 22, C.I. Pigment Red 23, C.I. Pigment Red 31, C.I. Pigment Red 38, C.I. Pigment Red 48:2, C.I. Pigment Red 48:2 (Permanent Red 2B (Ca)), C.I. Pigment Red 48:3, C.I. Pigment Red 48:4, C.I. Pigment Red 49:1, C.I. Pigment Red 52:2, C.I. Pigment Red 53:1, C.I. Pigment Red 57:1 (Brilliant Carmine 6B), C.I. Pigment Red 60:1, C.I. Pigment Red 63:1, C.I. Pigment Red 63:2, C.I. Pigment Red 64:1, C.I. Pigment Red 81, C.I. Pigment Red 83, C.I. Pigment Red 88, C.I. Pigment Red 101 (Bengara), C.I. Pigment Red 104, C.I. Pigment Red 105, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 184, C.I. Pigment Red 185, C.I. Pigment Red 190, C.I. Pigment Red 193, C.I. Pigment Red 202, C.I. Pigment Red 207, C.I. Pigment Red 208, C.I. Pigment Red 209, C.I. Pigment Red 213, C.I. Pigment Red 219, C.I. Pigment Red 224, C.I. Pigment Red 254, C.I. Pigment Red 264, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23, C.I. Pigment Violet 38, C.I. Pigment Blue 1, C.I. Pigment Blue 2, C.I. Pigment Blue 15 (Phthalocyanine Blue), C.I. Pigment Blue 15:1, C.I. Pigment Blue 15:2, C.I. Pigment Blue C.I. Pigment Blue 15:4 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18, and C.I. Pigment Green 36.

The dyes are not particularly limited, and acid dyes, direct dyes, reactive dyes, and basic dyes may be used. Each of these types of dyes may be used alone or in combination with others.

Specific examples of the dyes include, but are not limited to, C.I. Acid Yellow 17, C.I. Acid Yellow 23, C.I. Acid Yellow 42, C.I. Acid Yellow 44, C.I. Acid Yellow 79, C.I. Acid Yellow 142, C.I. Acid Red 52, C.I. Acid Red 80, C.I. Acid Red 82, C.I. Acid Red 249, C.I. Acid Red 254, C.I. Acid Red 289, C.I. Acid Blue 9, C.I. Acid Blue 45, C.I. Acid Blue 249, C.I. Acid Black 1, C.I. Acid Black 2, C.I. Acid Black 24, C.I. Acid Black 94, C.I. Food Black 1, C.I. Food Black 2, C.I. Direct Yellow 1, C.I. Direct Yellow 12, C.I. Direct Yellow 24, C.I. Direct Yellow 33, C.I. Direct Yellow 50, C.I. Direct Yellow 55, C.I. Direct Yellow 58, C.I. Direct Yellow 86, C.I. Direct Yellow 132, C.I. Direct Yellow 142, C.I. Direct Yellow 144, C.I. Direct Yellow 173, C.I. Direct Red 1, C.I. Direct Red 4, C.I. Direct Red 9, C.I. Direct Red 80, C.I. Direct Red 81, C.I. Direct Red 225, C.I. Direct Red 227, C.I. Direct Blue 1, C.I. Direct Blue 2, C.I. Direct Blue 15, C.I. Direct Blue 71, C.I. Direct Blue 86, C.I. Direct Blue 87, C.I. Direct Blue 98, C.I. Direct Blue 165, C.I. Direct Blue 199, C.I. Direct Blue 202, C.I. Direct Black 19, C.I. Direct Black 38, C.I. Direct Black 51, C.I. Direct Black 71, C.I. Direct Black 154, C.I. Direct Black 168, C.I. Direct Black 171, C.I. Direct Black 195, C.I. Reactive Red 14, C.I. Reactive Red 32, C.I. Reactive Red 55, C.I. Reactive Red 79, C.I. Reactive Red 249, C.I. Reactive Black 3, C.I. Reactive Black 4, and C.I. Reactive Black 35.

The proportion of the color material is preferably 0.1% by mass or more and 15% by mass or less, and more preferably 1% by mass or more and 10% by mass or less, with respect to the total amount of the color ink, from the viewpoint of improving image density and achieving good fixability and discharge stability.

Examples of methods of dispersing the pigment to obtain the ink include, but are not limited to, a method of introducing a hydrophilic functional group into a pigment to obtain a self-dispersing pigment, a method of coating the surface of a pigment with a resin to disperse the pigment, and a method of dispersing a pigment by using a dispersant.

Examples of the method of introducing a hydrophilic functional group into a pigment to obtain a self-dispersing pigment include, but are not limited to, a method of adding a functional group such as a sulfone group and a carboxyl group to a pigment (for example, carbon) to obtain a pigment that is dispersible in water.

Examples of the method of coating the surface of a pigment with a resin to disperse the pigment include, but are not limited to, a method of encapsulating the pigment in a microcapsule to obtain a pigment that is dispersible in water. Such a pigment may be referred to as a resin-coated pigment. In this case, it is not required that all pigments blended in the ink are coated with the resin, and pigments that are not coated with the resin and pigments that are partially coated with the resin may be dispersed in the ink, as long as the effects of the present embodiment are not impaired.

Examples of the method of dispersing a pigment by a dispersant include, but are not limited to, a method of dispersing a pigment by using a known dispersant having low molecular weight or a known dispersant having high molecular weight, which are represented by a surfactant. The dispersant may be selected according to the pigment, and anionic surfactants, cationic surfactants, amphoteric surfactants, and nonionic surfactants may be used as the dispersant. For example, RT-100 manufactured by Takemoto Oil & Fat Co., Ltd. (a nonionic surfactant) and a sodium naphthalenesulfonate formalin condensate may also be suitably used as the dispersant. Each of these dispersants may be used alone or in combination with others.

[Pigment Dispersion]

The ink may be obtained by mixing a pigment with materials such as water and an organic solvent. The ink may also be manufactured by mixing a pigment with other materials such as water and a dispersant to prepare a pigment dispersion, and then, mixing the pigment dispersion with other materials such as water and an organic solvent to manufacture the ink.

The pigment dispersion is obtained by mixing water, a pigment, a pigment dispersant, and other components if desired, to disperse the pigment, and adjusting the particle diameter of the pigment. The pigment may be dispersed by using a disperser.

The particle diameter of the pigment in the pigment dispersion is not particularly limited. However, from the viewpoint of improving the dispersion stability of the pigment and enhancing the discharge stability and the image quality such as the image density, the maximum frequency of the particle diameter obtained by maximum number conversion is preferably 20 nm or more and 500 nm or less, and more preferably 20 nm or more and 150 nm or less. The particle diameter of the pigment may be measured by using a particle size analyzer (NANOTRAC WAVE-UT151, manufactured by MicrotracBEL Corp.).

The proportion of the pigment in the pigment dispersion is not particularly limited and may be appropriately selected according to a purpose, but is preferably 0.1% by mass or more and 50% by mass or less, and more preferably 0.1% by mass or more and 30% by mass or less, from the viewpoint of achieving a good discharge stability and increasing the image density.

It is preferable to filter the pigment dispersion by using, if desired, a filter or a centrifugal separator to remove coarse particles, followed by degassing of the pigment dispersion.

[Physical Properties of Color Ink]

The physical properties of the color ink in the present embodiment are not particularly limited and may be appropriately selected according to a purpose. For example, the viscosity, the surface tension, and pH are preferably within the following ranges.

The viscosity of the color ink at 25° C. is preferably 5 mPa·s or more and 30 mPa·s or less, and more preferably 5 mPa·s or more and 25 mPa·s or less, from the viewpoint of improving the printing density and the character quality and obtaining good discharge properties. For example, the viscosity may be measured by a rotational viscometer (RE-80L, manufactured by Toki Sangyo Co., Ltd.). Regarding the measurement conditions, the viscosity may be measured at 25° C. with a standard cone rotor (1° 34'×R24), a sample liquid amount of 1.2 mL, a rotation speed of 50 rpm, and a measurement time of 3 minutes. Preferably, the surface tension of the color ink at 25° C. is 35 mN/m or less, and more preferably 32 mN/m or less, so that the ink is suitably leveled on a recording medium and the drying time of the ink is shortened.

The pH of the color ink is preferably from 7 to 12, and more preferably from 8 to 11, from the viewpoint of preventing corrosion of metal members in contact with liquids.

[Manufacturing Method of Color Ink]

The color ink according to the present embodiment is produced by dispersing or dissolving the above-described components in a water-based medium, and if desired, the mixture is stirred and mixed. A stirrer using normal stirring blades, a magnetic stirrer, a high-speed disperser, or the like may be used to stir and mix the components.

<Pretreatment Liquid>

The pretreatment liquid in the present embodiment contains the resin (R1) and may contain other components (I1) if desired.

<<Resin (R1)>>

The resin (R1) contained in the pretreatment liquid of the present embodiment is not particularly limited and may be appropriately selected according to a purpose, as long as the type of the bonding structure in the repeating unit of the molecule is identical to that of the resin (R3) and the resin (R2). Examples of the resin (R1) include, but are not limited to, the resins mentioned under the heading <<Resin (R3)>> above.

Similarly to the resin (R3), the resin (R1) is preferably added in the form of resin particles including these resins.

Similarly to the resin (R3) and the resin (R2), the resin (R1) is preferably a urethane resin. When the resin (R1) is a urethane resin, it is possible to obtain high adhesiveness to an impermeable base material and a color ink coating film.

The volume average particle diameter of the resin (R1) particles included in the pretreatment liquid is not particularly limited and may be appropriately selected according to a purpose, but is preferably 10 nm or more and 1000 nm or less, more preferably 10 nm or more and 200 nm or less, and particularly preferably 10 nm or more and 100 nm or less, from the viewpoint of achieving good fixability and high image hardness.

For example, the volume average particle diameter of the resin (R1) particles can be measured by using a particle size analyzer (NANOTRAC WAVE II, manufactured by MicrotracBEL Corp.).

The total proportion (solid content) of the resin (R1) particles contained in the pretreatment liquid is preferably 0.5% by mass or more and 20% by mass or less. The total proportion (solid content) of the resin (R1) particles is preferably 0.5% by mass or more, because in this case, the resin (R1) can sufficiently cover the impermeable base material, and thus, the adhesiveness is improved. The total proportion (solid content) of the resin (R1) particles preferably is 20% by mass or less, because in this case, the film thickness of a coating film derived from the pretreatment liquid does not increase too much, and thus, the adhesiveness is less likely to decrease.

<<Other Components (I1)>>

The other components (I1) are not particularly limited and may be appropriately selected according to a purpose. Examples thereof include, but are not limited to, organic solvents, water, polyvalent metal compounds, surfactants, defoaming agents, preservatives and fungicides, rust inhibitors, and pH adjusters. Among these, surfactants are preferred. The other components (I1) may have a similar composition and proportion as those described under the heading <<Other Components (I3)>> in the section <Clear Ink> above.

<<<Organic Solvent>>>

The organic solvent contained in the pretreatment liquid may have a similar composition and proportion to those described under the heading <<<Organic Solvent>>> in the section <<Other Components (I3)>> above.

The proportion of the organic solvent included in the pretreatment liquid is not particularly limited and may be appropriately selected according to a purpose, but is preferably 10% by mass or more and 60% by mass or less, and more preferably 20% by mass or more and 60% by mass or less with respect to the total amount of the pretreatment liquid, from the viewpoint of the drying properties and the discharge reliability of the ink.

From the viewpoint of improving the film-forming properties and the adhesiveness of the resin (R1), the pretreatment liquid preferably contains any one of 1,2-propanediol, 1,2-butanediol, and 2,3-butanediol as the organic solvent.

<<<Water>>>

The water contained in the pretreatment liquid may have a composition similar to that described under the heading <<<Water>>> in the section <<Clear Ink>> above.

The proportion of the water included in the pretreatment liquid is not particularly limited and may be appropriately selected according to a purpose, but is preferably 10% by mass or more and 90% by mass or less, and more preferably 20% by mass or more and 60% by mass or less with respect to the total amount of the pretreatment liquid, from the viewpoint of the drying properties and the discharge reliability.

<<<Polyvalent Metal Compound>>>

The polyvalent metal compound can quickly coagulate the pigment in the ink after droplet deposition, suppress color bleeding, and improve color development.

The polyvalent metal compound is not particularly limited and may be appropriately selected according to a purpose. Examples thereof include, but are not limited to, titanium compounds, chromium compounds, copper compounds, cobalt compounds, strontium compounds, barium compounds, iron compounds, aluminum compounds, calcium compounds, magnesium compounds, nickel compounds, and salts of these metal compounds (polyvalent metal salts).

Among these, it is preferable to use one or more types selected from the calcium compounds, magnesium compounds, and nickel compounds, and more preferably, alkaline earth metals such as calcium and magnesium, from the viewpoint of effective coagulation of the pigment.

The polyvalent metal compound is preferably an ionic polyvalent metal compound.

The ionic polyvalent metal compound is not particularly limited, may be appropriately selected according to a purpose, and examples thereof include, but are not limited to, a polyvalent metal salt. Examples of the polyvalent metal salt include, but are not limited to, titanium salts, chromium salts, copper salts, cobalt salts, strontium salts, barium salts, iron salts, aluminum salts, calcium salts, potassium salts, sodium salts, nickel salts, and magnesium salts. Among these, calcium salts are preferable from the viewpoint of better stability of the reaction solution.

A counter ion of the salt in the polyvalent metal salt is not particularly limited, may be appropriately selected according to a purpose, and examples thereof include, but are not limited to, carboxylic acid and phosphoric acid.

Specific examples of the polyvalent metal compound include, but are not limited to, calcium carbonate, calcium nitrate, calcium chloride, calcium acetate, calcium sulfate, magnesium chloride, magnesium acetate, magnesium sulfate, barium sulfate, zinc sulfide, zinc carbonate, aluminum silicate, calcium silicate, magnesium silicate, and aluminum hydroxide.

Among these compounds, calcium acetate is preferable for the purpose of preventing a decrease in the strength of a pre-coating layer (a coating film formed by the pretreatment liquid) due to deliquescence.

When the polyvalent metal compound is ionic (is a polyvalent metal salt), the concentration of the polyvalent metal ion is preferably 0.05 mol/kg or more and 0.5 mol/kg or less with respect to the entire pretreatment liquid, because in this case, excellent storage stability is achieved and color bleeding is suppressed.

If the resin (R1), the resin (R2), and the resin (R3) in the present embodiment are resin emulsions dispersed in a solvent, the method described below may be used as a method for measuring the glass transition temperature of the resin emulsion.

A differential scanning calorimeter (TA-60WS and DSC-60, manufactured by Shimadzu Corporation) is used to measure the glass transition temperature of the resin emulsion. First, 4 g of the resin emulsion are placed in a petri dish made of a tetrafluoroethylene/perfluoroalkyl vinyl ether copolymer (PFA) with a diameter of 50 mm and the resin emulsion is spread evenly and dried at 50° C. for one week. Subsequently, 5.0 mg of the obtained resin film are placed in a sample container made of aluminum, the sample container is placed in a holder unit, and the holder unit is placed in an electric furnace. Next, in a nitrogen atmosphere, the temperature in the furnace is raised from 0° C. to 150° C. at a heating rate of 10° C./min, and then, the temperature is lowered from 150° C. to −80° C. at a cooling rate of 5° C./min. Subsequently, the temperature is again increased to 150° C. at a heating rate of 10° C./min to measure the DSC curve. An analysis program in the DSC-60 system may be used to analyze the obtained DSC curve by the midpoint method using an inflection part at the time of the second temperature increase to determine the glass transition temperature (Tg).

<Impermeable Base Material>

The ink set of the present embodiment is an ink set for an impermeable base material and is used to form an image on an impermeable base material.

The impermeable base material is a base material having a surface with low water permeability and absorbency, and also includes materials that have a large number of cavities on the inside but do not open to the outside. More quantitatively, the impermeable base material is a base material in which the amount of absorbed water from the start of contact to msec$^{1/2}$ is 10 mL/m$^2$ or less in the Bristow method.

As specific examples of the impermeable base material, plastic films such as vinyl chloride resin films, polyethylene terephthalate (PET) films, acrylic resin films, polypropylene films, polyethylene films, and polycarbonate films may be suitably used as the impermeable base material.

The ink set of the present embodiment may be used to form an image on a general recording medium and the like, in addition to the impermeable base material. The general recording medium is not particularly limited, as long as the ink and various types of treatment liquids can adhere thereto even temporarily. Examples of the general recording medium include, but are not limited to, plain paper, glossy paper, special paper, fabrics, building materials such as wallpaper, flooring materials, and tiles, clothing fabrics such as in T-shirts, textiles, and leather.

Ceramics, glass, metals, and the like can also be used by adjusting a configuration of the path for conveying the recording medium.

Herein, the "impermeable base material" and the "recording medium" may be collectively referred to as a "material to be printed".

(Image Forming Method)

An image forming method of the present embodiment is an image forming method for forming an image on an impermeable base material, includes a step of applying a pretreatment liquid containing a resin (R1) onto the impermeable base material, a step of applying a color ink containing a resin (R2), and a step of applying a clear ink containing a resin (R3). The resin (R1), the resin (R2), and the resin (R3) are characterized in that the type of the bonding structure in the repeating unit of the molecules is identical.

The image forming method may include other steps as desired.

For the pretreatment liquid, the color ink, and the clear ink, similar materials as those described under the headings (Pretreatment Liquid), (Color Ink), and (Clear Ink) above may be used.

The other steps are not particularly limited, may be appropriately selected according to a purpose, and examples thereof include, but are not limited to, a heating/drying step.

The heating/drying step can be suitably performed by a heating/drying unit described later.

(Image Forming Apparatus)

An image forming apparatus of the present embodiment is an image forming apparatus for forming an image on an impermeable base material, includes a unit that applies a pretreatment liquid containing a resin (R1) onto the impermeable base material, a unit that applies a color ink containing a resin (R2), and a unit that applies a clear ink containing a resin (R3). The resin (R1), the resin (R2), and the resin (R3) are characterized in that the type of the bonding structure in the repeating unit of the molecules is identical.

The image forming apparatus may include other units as desired.

For the pretreatment liquid, the color ink, and the clear ink, similar materials as those described under the headings (Pretreatment Liquid), (Color Ink), and (Clear Ink) above may be used.

The unit that applies a pretreatment liquid, the unit that applies a color ink, and the unit that applies a clear ink are not particularly limited and may be appropriately selected according to a purpose. These units may employ a method such as an inkjet method (technique), a blade coating method, a gravure coating method, a gravure offset coating method, a bar coating method, a roll coating method, a knife coating method, an air knife coating method, a comma coating method, a U-comma coating method, an AKKU coating method, a smoothing coating method, a micro gravure coating method, a reverse roll coating method, a 4-roll coating method, a 5-roll coating method, a dip coating method, a curtain coating method, a slide coating method, and a die coating method. Among these methods, the inkjet method (technique) is preferable. Application by the inkjet method is more preferable, because the ink can be applied uniformly over the entire area of the material to be printed, and it is possible to apply a minimum necessary amount of the material by adjusting the droplet size.

The other units are not particularly limited, may be appropriately selected according to a purpose, and examples thereof include, but are not limited to, a heat-dryer.

The heat-dryer. is not particularly limited and may be appropriately selected according to a purpose. Examples thereof include, but are not limited to, a conduction heater using ceramic or a nichrome wire, and a hot air fan.

Herein, "the step of applying a pretreatment liquid containing a resin (R1) onto an impermeable base material" may be referred to as a "pretreatment liquid application step", the "step of applying a color ink containing a resin (R2)" may be referred to as a "color ink application step", and the "step of applying a clear ink containing a resin (R3)" may be referred to as a "clear ink application step", respectively. Herein, "the unit of applying a pretreatment liquid containing a resin (R1) onto an impermeable base material" may be referred to as a "pretreatment liquid applicator", the "unit of applying a color ink containing a resin (R2)" may be referred to as a "color ink applicator", and the "unit of applying a clear ink containing a resin (R3)" may be referred to as a "clear ink applicator", respectively.

The pretreatment liquid application step can be suitably implemented by the pretreatment liquid applicator, the color ink application step can be suitably implemented by the color ink applicator, the clear ink application step can be suitably implemented by the clear ink applicator, and the other steps can be suitably implemented by the other units.

The pretreatment liquid, the color ink, and the clear ink used in the present embodiment can be suitably employed in various types of discharge apparatuses using an inkjet recording method, such as printers, facsimile machines, photocopiers, multifunction peripherals functioning as a printer/facsimile machine/copier, and three-dimensional object fabrication apparatuses.

Unless otherwise specified, the inkjet discharge apparatus includes both a serial-type apparatus in which a discharge head is moved and a line-type apparatus in which the discharge head is not moved. Further, the inkjet discharge apparatus includes not only a desktop-type apparatus, but also a wide-width discharge apparatus and for example, printers for continuous sheets in which a continuous sheet wound into a roll can be used as the recording medium.

The image forming apparatus of the present embodiment includes not only a head portion for discharging ink, but may include a unit involved in feeding, conveying, and discharging an impermeable base material or a recording medium, and may further include a device referred to as a pretreatment device, a post-treatment device, and the like.

The image forming apparatus and the image forming method are not limited to an apparatus and a method that visualize meaningful images, such as characters and figures, by using ink. For example, the image forming apparatus and the image forming method also include an apparatus and a method for forming patterns such as geometric patterns and the like, and an apparatus and a method for fabricating three-dimensional images.

Unless otherwise specified, the image forming apparatus includes both a serial-type apparatus in which a discharge head is moved and a line-type apparatus in which the discharge head is not moved. The image forming apparatus includes not only a desktop-type image forming apparatus, but also includes a wide-width discharge apparatus that can also print on a recording medium having A0 size, and for example, printers for continuous sheets in which a continuous sheet wound into a roll can be used as the recording medium.

Below, the ink set, the image forming method, and the image forming apparatus according to the present embodiment will be described with reference to the drawings. The present embodiment is not limited to the embodiment described below, may be another embodiment, and may be subject to changes such as additions, modifications, and omissions within the scope conceivable for a person skilled in the art. All of these changed configurations are also included in the scope of the present embodiment, as long as an operation and an effect of the present embodiment are exhibited.

In the following description of the image forming apparatus and the image forming method, a case where black (K) ink, cyan (C) ink, magenta (M) ink, and yellow (Y) ink are used is described. Alternatively, or in addition thereto, a pretreatment liquid and clear ink may be used.

Figure 2:
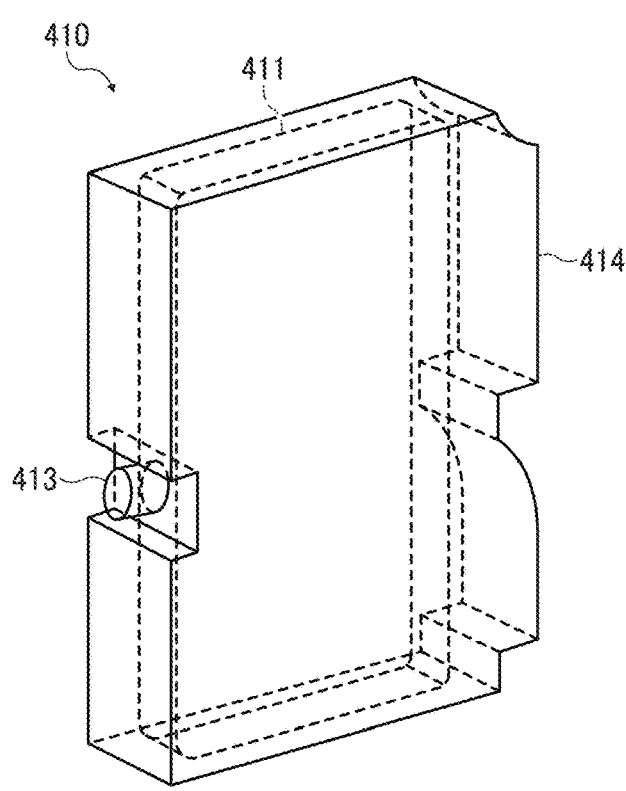
FIG. 2 is a perspective explanatory view generally illustrating an example of a main tank according to the present embodiment.

An example of an image forming apparatus according to the present embodiment will be described with reference to FIGS. 1 and 2. FIG. 1 is a perspective explanatory view of an image forming apparatus. FIG. 2 is a perspective explanatory view of a main tank in the image forming apparatus of FIG. 1.

An image forming apparatus 400 as an example of the image forming apparatus is a serial-type image forming apparatus.

A mechanical portion 420 is provided inside an exterior package 401 of the image forming apparatus 400. Main tanks 410 (410k, 410c, 410m, and 410y) for each color including black (K), cyan (C), magenta (M), and yellow (Y) each include an ink accommodating portion 411. The ink accommodating portion 411 is formed of a packaging member such as an aluminum laminate film, for example. The ink accommodating portion 411 is accommodated in a container accommodating case 414 formed of plastic. Thus, each of the main tanks 410 is used as an ink cartridge for a corresponding one of the colors.

On the other hand, a cartridge holder 404 is provided on an inner side of the opening when a cover 401c of an apparatus main body is opened. The main tanks 410 are mounted attachably and detachably with respect to the cartridge holder 404. Thus, an ink discharge port 413 of each of the main tanks 410 communicates, via a supply tube 436 for each color, with a discharge head 434 for each color, so that the ink can be discharged from the discharge head 434 onto a recording medium.

The image forming apparatus may not only include a portion that discharges ink, but also a device referred to as a pretreatment device, a post-treatment device, and the like. In one aspect, similarly to the case where the ink includes black (K), cyan (C), magenta (M), and yellow (Y) inks, the pretreatment device and the post-treatment device may additionally include a discharge head and a liquid accommodating portion including the pretreatment liquid or the post-treatment liquid, so that the pretreatment liquid and the post-treatment liquid are discharged by an inkjet recording method. In another aspect of the pretreatment device and the post-treatment device, a pretreatment device and a post-treatment device using a method other than the inkjet recording method, such as a blade coating method, a roll coating method, and a spray coating method, are provided.

Figure 3:
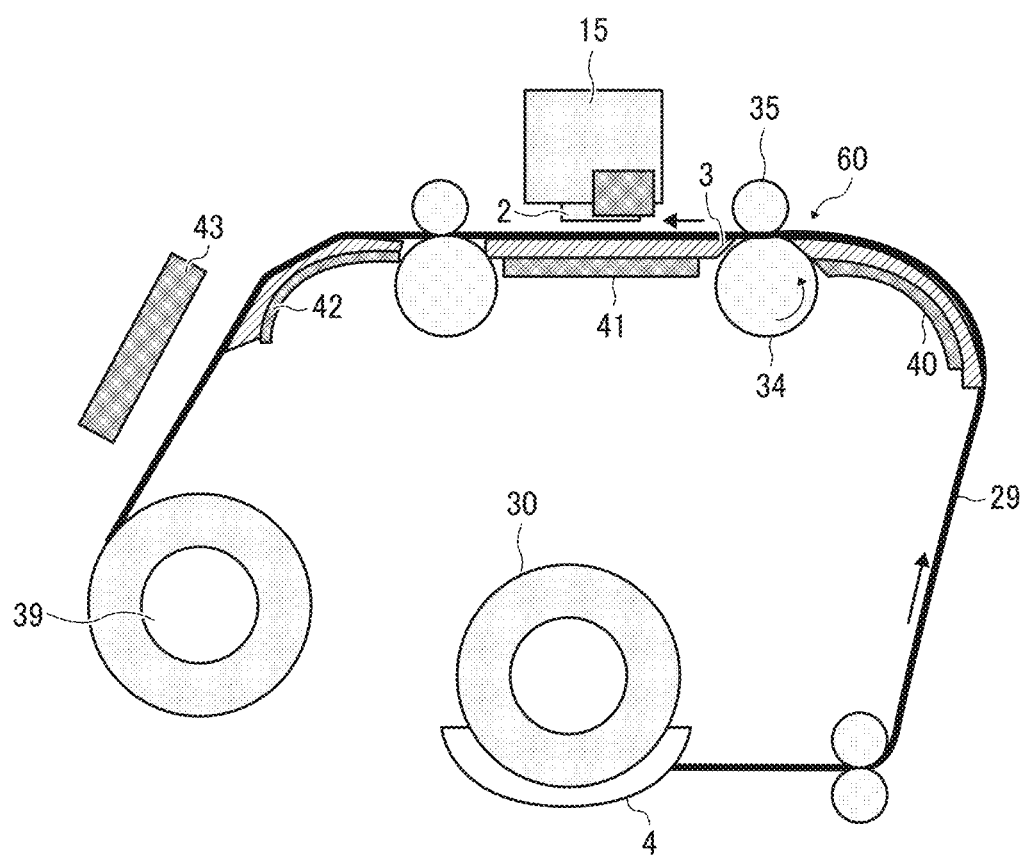
FIG. 3 is a schematic view illustrating an example of the inside of an image forming apparatus main body.

FIG. 3 is a schematic view of the inside of an image forming apparatus main body.

The image forming apparatus includes a recording head 2, a platen 3, a roll medium accommodating portion 4, a heating unit, and the like.

A carriage 15 houses clear ink and, if desired, color ink including black (K), yellow (Y), magenta (M), and cyan (C) ink, and includes the recording head 2 as a discharging unit that discharges ink droplets.

The roll medium accommodating portion 4 is a sheet feeding unit, and a roll medium (recording medium) 30, which is a material to be printed, is placed in the roll medium accommodating portion 4.

A conveying unit 60 sandwiches a recording medium 29 and/or the platen 3 and includes a feed roller 34 and a pressing roller 35 which are arranged to face each other above and below the conveying unit 60.

The material to be printed (recording medium) 29 is sandwiched between the feed roller 34 and the pressing roller 35, and the feed roller 34 is rotated forward (in the direction of the arrow in FIG. 3) to convey the recording medium 29 placed on the platen 3 forward on top of the platen 3.

Further, a preheater 40 and a print heater 41 are provided. The preheater 40 (heating before printing) preliminarily heats the recording medium 29 on an upstream side of the platen 3 in a recording medium conveyance direction. The print heater 41 is provided as a heating unit (heating during printing) that heats a material to be printed while the clear ink is applied to the material to be printed from nozzles of the recording head 2.

Downstream of the platen 3 on a downstream side of the recording head 2, a post-heater 42 may be provided (heating after printing). It is preferable to provide the post-heater 42, because in this case, the recording medium 29 can be continuously heated and deposited ink droplets can be dried quicker.

For example, the preheater 40, the print heater 41, and the post-heater 42 may be conduction heaters using ceramic or a nichrome wire. Further, another unit such as a hot air heating unit may be used as the heating/drying unit.

On the downstream side after the starting point of the post-heater 42, another heating unit such as a hot air fan 43 that blows hot air onto a recording surface of the recording medium 29 on which ink is deposited, may be provided.

The hot air fan 43 directly blows hot air onto the ink on the recording surface of the recording medium 29 to dry the ink completely. Subsequently, a winding roll 39 may wind up the recording medium 29.

The ink set of the present embodiment may be applied not only to the inkjet recording method, but also to a wide range of other methods. Examples of methods other than the inkjet recording method include, but are not limited to, a blade coating method, a gravure coating method, a bar coating method, a roll coating method, a dip coating method, a curtain coating method, a slide coating method, a die coating method, and a spray coating method.

The applications of the ink set of the present embodiment are not particularly limited and may be appropriately selected according to a purpose. For example, the ink set can be used for printed objects, paints, coating materials, and foundations.

The ink can be used not only to form two-dimensional characters and images but also as a three-dimensional fabrication material for forming three-dimensional images (three-dimensional fabricated objects).

The three-dimensional object fabrication apparatus for fabricating three-dimensional fabricated objects may be any known apparatus and is not particularly limited. For example, an apparatus including an accommodating unit, a supplying unit, a discharging unit, and a drying unit for ink may be used as the three-dimensional object fabrication apparatus. The three-dimensional fabricated object includes a three-dimensional fabricated object obtained by applying ink in an overlaying manner.

Further, the three-dimensional fabricated object also includes a molded product obtained by processing a structure body in which ink is applied to a base material such as a recording medium. For example, the molded product is obtained by subjecting a recording material or a structure body formed in a sheet shape or a film shape to a molding process such as a heat-drawing and punching process. The molded product is suitably used for applications in which a surface is to be molded after decoration, such as in automobiles, OA equipment, electric/electronic devices, meters such as cameras, and panels such as operation portions.

In the present embodiment, the terms "image formation", "recording", "character printing", and "printing" may be used synonymously with each other.

In the present embodiment, the terms "recording medium", "medium", and "material to be printed" may be used synonymously with each other.

EXAMPLES

Examples according to the present embodiment will be described below, but the present embodiment is in no way limited to these examples.

Unless otherwise specified, the conditions used to prepare and evaluate samples included a room temperature of 25° C. and a humidity of 60%.

Preparation Example 1

Preparation of Resin Emulsion 1 (Polycarbonate-Based Urethane Resin)

A stirrer, a reflux condenser, and a thermometer were fitted into a reaction vessel, and 1,500 parts by mass of polycarbonate diol (a reaction product of 1,6-hexanediol and dimethyl carbonate, manufactured by Asahi Kasei Chemicals Corporation, number average molecular weight (Mn) of 1,200), 300 parts by mass of 2,2-dimethylolpropionic acid (manufactured by Tokyo Chemical Industry Co., Ltd.) (may be referred to as "DMPA" hereinafter), and 1,420 parts by mass of N-methylpyrrolidone (manufactured by Mitsubishi Chemical Corporation) (may be referred to as "NMP" hereinafter) were filled into the reaction vessel under a stream of nitrogen and heated to 60° C. to dissolve DMPA.

Next, 1,824 parts by mass of 4,4'-dicyclohexylmethane diisocyanate (manufactured by Tokyo Chemical Industry Co., Ltd.) and 2.6 parts by mass of dibutyltin dilaurate (a catalyst) (manufactured by Tokyo Chemical Industry Co., Ltd.) were added and the mixture was heated to 90° C. and reacted in a urethane-producing reaction over 5 hours to obtain a urethane prepolymer having an isocyanate end. The reaction mixture was cooled to 80° C. and 260 parts by mass of triethylamine (manufactured by Fujifilm Wako Pure Chemical Industries, Ltd.) were added to the mixture. 4,340 parts by mass were extracted from the mixture and added to a mixed solution of 5,400 parts by mass of water and 15 parts by mass of triethylamine under strong stirring.

Subsequently, 1,500 parts by mass of ice were added, and 830 parts by mass of an aqueous 35% by mass 2-methyl-1,5-pentanediamine solution (manufactured by Tokyo Chemical Industry Co., Ltd.) were added to carry out a chain extension reaction. The solvent was removed by distillation so that the solid content concentration was 30% by mass, and Resin Emulsion 1 was obtained.

The glass transition temperature (Tg) of the obtained Resin Emulsion 1 was measured according to the section <Method of Measuring Glass Transition Temperature of Resin Emulsion> described below, and the measured glass transition temperature was 55° C.

The volume average particle diameter of the resin particles contained in the Resin Emulsion 1 was measured by using a particle size analyzer (NANOTRAC WAVE II, manufactured by MicrotracBEL Corp.) and found to be 44 nm.

<<Method of Measuring Glass Transition Temperature of Resin Emulsion>>

A differential scanning calorimeter (TA-60WS and DSC-60, manufactured by Shimadzu Corporation) was used to measure the glass transition temperature of the resin emulsion.

First, the Resin Emulsion 1 (4 g) was placed in a petri dish made of a tetrafluoroethylene/perfluoroalkyl vinyl ether copolymer (PFA) with a diameter of 50 mm and the Resin Emulsion 1 was spread evenly and dried at 50° C. for one week. Subsequently, 5.0 mg of the obtained resin film were placed in a sample container made of aluminum, the sample container was placed in a holder unit, and the holder unit was placed in an electric furnace. Next, in a nitrogen atmosphere, the temperature in the furnace was raised from 0° C. to 150° C. at a heating rate of 10° C./min, and then, the temperature was lowered from 150° C. to −80° C. at a cooling rate of 5° C./min. Subsequently, the temperature was again raised to 150° C. at a heating rate of 10° C./min to measure the DSC curve. An analysis program in the DSC-60 system was used to analyze the obtained DSC curve by the midpoint method using an inflection part at the time of the second temperature increase to determine the glass transition temperature (Tg).

Preparation Example 2

Preparation of Resin Emulsion 2 (Polyester-Based Urethane Resin)

A stirrer, a thermometer, a nitrogen sealing tube, and a condenser were fitted into a 2 L reaction vessel, and 100 parts by mass of methyl ethyl ketone (MEK, manufactured by Sankyo Chemical Co., Ltd.), 345 parts by mass of polyester polyol (1) (polyester polyol obtained from IPA/AA=6/4 (mole ratio) and EG/NPG=1/9 (mole ratio) (manufactured by DIC Corporation), number average molecular weight: 2,000, average number of functional groups: 2, IPA: isophthalic acid, AA: adipic acid, EG: ethylene glycol, and NPG: neopentyl glycol), and 9.92 parts by mass of 2,2-dimethylolpropionic acid (DMPA) were filled into the reaction vessel and uniformly mixed at 60° C.

After that, 40.5 parts by mass of triethylene glycol diisocyanate (TEGDI) and 0.08 parts by mass of dioctyltin dilaurate (DOTDL) were added and the obtained mixture was reacted at 72° C. for 3 hours to obtain a polyurethane solution.

80 parts by mass of IPA, 220 parts by mass of MEK, 3.74 parts by mass of triethanolamine (TEA), and 596 parts by mass of water were added to the polyurethane solution to perform phase inversion, and then, MEK and IPA were removed using a rotary evaporator, to obtain Resin Emulsion 2.

After cooling the obtained Resin Emulsion 2 to room temperature, ion-exchanged water and an aqueous sodium hydroxide solution were added to adjust the solid content concentration to 30% by mass and the pH to 8.

The glass transition temperature of the obtained Resin Emulsion 2 was measured similarly to Resin Emulsion 1, and was found to be −4° C.

The volume average particle diameter of the obtained Resin Emulsion 2 was measured similarly to Resin Emulsion 1, and was found to be 105 nm.

Preparation Example 3

Preparation of Resin Emulsion 3 (Polycarbonate-Based Urethane Resin)

A stirrer, a reflux condenser, and a thermometer were fitted into a reaction vessel, and 1,500 parts by mass of polycarbonate diol (a reaction product of 1,6-hexanediol and dimethyl carbonate, manufactured by Asahi Kasei Chemicals Corporation, number average molecular weight (Mn) of 1,000), 260 parts by mass of 2,2-dimethylolpropionic acid (manufactured by Tokyo Chemical Industry Co., Ltd.) (may be referred to as "DMPA" hereinafter), and 1,320 parts by mass of N-methylpyrrolidone (manufactured by Mitsubishi Chemical Corporation) (may be referred to as "NMP" hereinafter) were filled into the reaction vessel under a stream of nitrogen and heated to 60° C. to dissolve DMPA.

Next, 1,530 parts by mass of 4,4'-dicyclohexylmethane diisocyanate (manufactured by Tokyo Chemical Industry Co., Ltd.) and 2.6 parts by mass of dibutyltin laurate (a catalyst) (manufactured by Tokyo Chemical Industry Co., Ltd.) were added and the mixture was heated to 90° C. and reacted in a urethane-producing reaction over 5 hours to obtain a urethane prepolymer having an isocyanate end. The reaction mixture was cooled to 80° C. and 245 parts by mass of triethylamine (manufactured by Fujifilm Wako Pure Chemical Industries, Ltd.) were added to the mixture. 4,340 parts by mass were extracted from the mixture and added into a mixed solution of 5,400 parts by mass of water and 15 parts by mass of triethylamine under strong stirring.

Subsequently, 1,500 parts by mass of ice were added, and 793 parts by mass of an aqueous 35% by mass 2-methyl-1, 5-pentanediamine solution (manufactured by Tokyo Chemical Industry Co., Ltd.) were added to carry out a chain extension reaction. The solvent was removed by distillation so that the solid content concentration was 30% by mass, and Resin Emulsion 3 was obtained.

The glass transition temperature of the obtained Resin Emulsion 3 was measured similarly to Resin Emulsion 1, and was found to be 45° C. The volume average particle diameter of the Resin Emulsion 3 was measured similarly to Resin Emulsion 1, and was found to be 40 nm.

Preparation Example 4

Preparation of Resin Emulsion 4 (Acrylic Resin)

Commercially available MOWINYL 6940 (manufactured by Japan Coating Resin Co., Ltd., Tg: −2° C.) was used as Resin Emulsion 4.

Preparation Example 5

Preparation of Resin Emulsion 5 (Acrylic Resin)

Commercially available MOWINYL 6951 (manufactured by Japan Coating Resin Co., Ltd., Tg: −25° C.) was used as Resin Emulsion 5.

Manufacturing Example 1

<Manufacturing of Pretreatment Liquid A>

30% by mass of Resin Emulsion 1 of Preparation Example 1 (solid content concentration: 30% by mass), 1.8% by mass of calcium acetate monohydrate (manufactured by Fujifilm Wako Pure Chemical Industries, Ltd.), 1.5% by mass of EMULGEN LS-106 (a surfactant, manufactured by Kao Corporation), 10% by mass of 1,2-propanediol (trade name: propylene glycol, manufactured by ADEKA Corporation), 0.2% by mass of PROXEL LV (a preservative, manufactured by Avecia Inc.), and 56.5% by mass of high-purity water were added and mixed and stirred to prepare a mixture.

The obtained mixture was filtered through a GF filter (trade name: MINISART, manufactured by Sartorius) having an average pore size of 5 to prepare Pretreatment Liquid A.

Manufacturing Examples 2 to 6

<Manufacturing of Pretreatment Liquids B to F>

Pretreatment Liquids B to F were prepared similarly to Manufacturing Example 1, except that the ink composition in Manufacturing Example 1 was changed to the ink compositions illustrated in Table 1.

TABLE 1

|  |  | Manufacturing Example 1 Pretreatment Liquid A | Manufacturing Example 2 Pretreatment Liquid B | Manufacturing Example 3 Pretreatment Liquid C | Manufacturing Example 4 Pretreatment Liquid D | Manufacturing Example 5 Pretreatment Liquid E | Manufacturing Example 6 Pretreatment Liquid F |
|---|---|---|---|---|---|---|---|
| Resins | Resin Emulsion 1 | 30 | 5 |  |  |  |  |
|  | Resin Emulsion 2 |  |  | 30 |  |  |  |
|  | Resin Emulsion 3 |  |  |  | 25 |  |  |
|  | Resin Emulsion 4 |  |  |  |  | 30 |  |
|  | Resin Emulsion 5 |  |  |  |  |  | 30 |
| Polyvalent metal salt | Calcium acetate monohydrate | 1.8 | 1.8 | 1.8 | 1.8 | 1.8 | 1.8 |
| Surfactant | EMULGEN LS-106 | 1.5 | 1.5 | 1.5 | 1.5 | 1.5 | 1.5 |

TABLE 1-continued

|  |  | Manufacturing Example 1 Pretreatment Liquid A | Manufacturing Example 2 Pretreatment Liquid B | Manufacturing Example 3 Pretreatment Liquid C | Manufacturing Example 4 Pretreatment Liquid D | Manufacturing Example 5 Pretreatment Liquid E | Manufacturing Example 6 Pretreatment Liquid F |
|---|---|---|---|---|---|---|---|
| Organic solvent | 1,2-Propanediol | 10 | 10 | 10 | 10 | 10 | 10 |
| Preservative | PROXEL LV | 0.2 | 0.2 | 0.2 | 0.2 | 0.2 | 0.2 |
| Water | High-purity water | 56.5 | 81.5 | 56.5 | 61.5 | 56.5 | 56.5 |
| Total (mass %) |  | 100 | 100 | 100 | 100 | 100 | 100 |

Manufacturing Example 7

<Manufacturing of Clear Ink A>

29.5% by mass of Resin Emulsion 1 of Preparation Example 1 (solid content concentration: 30% by mass), 0.5% by mass of Resin Emulsion 2 of Preparation Example 2 (solid content concentration: 30% by mass), 18% by mass of 1,2-propanediol, 10% by mass of 1,3-propanediol (manufactured by Fujifilm Wako Pure Chemical Industries, Ltd.), 3% by mass of 1,2-butanediol (manufactured by Mitsubishi Chemical Corporation), 7% by mass of FS-300 (fluorine-based surfactant, manufactured by DuPont, solid content concentration of 40% by mass) as a surfactant, and 31.8% by mass of high-purity water were added and mixed and stirred to prepare a mixture.

Next, the obtained mixture was filtered through a polypropylene filter having an average pore size of 0.2 μm (trade name: BETAFINE polypropylene pleated filter PPG series, manufactured by 3M Co., Ltd.) to prepare Clear Ink A.

Manufacturing Examples 8 to 12

<Manufacturing of Clear Inks B to F>

Clear Inks B to F were prepared similarly to Manufacturing Example 1, except that the ink composition in Manufacturing Example 1 was changed to the ink compositions illustrated in Table 2.

The glass transition temperature (Tg) of a dry film of the Clear Inks A to F was measured according to <<Method of Measuring Glass Transition Temperature of Dry Film of Clear Ink>> described below.

Further, the volume average particle diameter of the clear ink was measured similarly as for the Resin Emulsion 1.

The "solid content of resin in clear ink (% by mass)", the "volume average particle diameter of resin particles in clear ink", the "glass transition temperature (Tg) of dry film of clear ink", and the "mass ratio MA:MB of mass MA (mg) of resin particles A having Tg of or higher to mass MB (mg) of resin particles B having Tg of less than 0° C." are presented in Table 2.

<<Method of Measuring Glass Transition Temperature of Dry Film of Clear Ink>>

The glass transition temperature of a dry film of the clear ink was measured using a differential scanning calorimeter (TA-60WS and DSC-60, manufactured by Shimadzu Corporation).

First, 4 g of clear ink were placed in a petri dish made of a tetrafluoroethylene/perfluoroalkyl vinyl ether copolymer (PFA) with a diameter of 50 mm and the clear ink was spread evenly and dried at 50° C. for one week. Subsequently, 5.0 mg of the obtained ink film were placed in a sample container made of aluminum, the sample container was placed in a holder unit, and the holder unit was placed in an electric furnace. Next, in a nitrogen atmosphere, the temperature in the furnace was raised from 0° C. to 150° C. at a heating rate of 10° C./min, and then, the temperature was lowered from 150° C. to −80° C. at a cooling rate of 5° C./min. Subsequently, the temperature was again raised to 150° C. at a heating rate of 10° C./min to measure the DSC curve. An analysis program in the DSC-60 system was used to analyze the obtained DSC curve by the midpoint method using an inflection part at the time of the second temperature increase to determine the glass transition temperature (Tg).

TABLE 2

|  |  | Manufacturing Example 7 Clear Ink A | Manufacturing Example 8 Clear Ink B | Manufacturing Example 9 Clear Ink C | Manufacturing Example 10 Clear Ink D | Manufacturing Example 11 Clear Ink E | Manufacturing Example 12 Clear Ink F |
|---|---|---|---|---|---|---|---|
| Resins | Resin Emulsion 1 | 29.3 | 30 |  |  |  |  |
|  | Resin Emulsion 2 | 0.7 |  | 30 |  |  |  |
|  | Resin Emulsion 3 |  |  |  | 30 |  |  |
|  | Resin Emulsion 4 |  |  |  |  | 20 |  |
|  | Resin Emulsion 5 |  |  |  |  |  | 20 |
| Water | High-purity water | 31.8 | 31.8 | 23.8 | 29.8 | 36.8 | 36.8 |
| Surfactant | FS-300 | 7 | 7 | 7 | 7 | 7 | 7 |
| Organic solvents | 1,2-Propanediol | 18 | 18 | 25 | 20 | 18 | 18 |
|  | 1,3-Propanediol | 10 | 10 | 11 | 10 | 15 | 15 |

TABLE 2-continued

| | | Manufacturing Example 7 Clear Ink A | Manufacturing Example 8 Clear Ink B | Manufacturing Example 9 Clear Ink C | Manufacturing Example 10 Clear Ink D | Manufacturing Example 11 Clear Ink E | Manufacturing Example 12 Clear Ink F |
|---|---|---|---|---|---|---|---|
| | 1,2-Butanediol | 3 | 3 | 3 | 3 | 3 | 3 |
| Rust inhibitor | PROXEL LV | 0.2 | 0.2 | 0.2 | 0.2 | 0.2 | 0.2 |
| | Total (mass %) | 100 | 100 | 100 | 100 | 100 | 100 |
| | Solid content of resin in clear ink (mass %) | 10 | 10 | 10 | 10 | 7.5 | 7.5 |
| | Volume average particle diameter of particles in clear ink (nm) | 44 nm | 44 nm | 105 nm | 40 nm | 46 nm | 41 nm |
| | MA:MB | 98:2 | — | — | — | — | — |
| | Tg of dry film of clear ink | 55° C., −4° C. | 55° C. | −4° C. | 45° C. | −2° C. | −25° C. |

Manufacturing Example 13

<Manufacturing of Color Ink A>

Preparation of Self-dispersing Magenta Pigment Dispersion

A self-dispersing magenta pigment dispersion (solid content concentration of pigment: 15% by mass) was obtained by premixing a mixture of the following formulation, and circulating and dispersing the mixture for 7 hours in a disk-type bead mill (manufactured by Shinmaru Enterprises Corporation, KDL model, medium: using zirconia balls having a diameter of 0.3 mm).
 Pigment Red 122 . . . 15 parts by mass (trade name: TONER MAGENTA EO02, manufactured by Clariant Japan)
 Anionic surfactant . . . 2 parts by mass (trade name: PIONINE A-51-B, manufactured by Takemoto Oil & Fat Co., Ltd.)
 Ion-exchanged water . . . 83 parts by mass
 —Manufacturing of Magenta Ink A—
 25% by mass of Resin Emulsion 1 of Preparation Example 1 (solid content concentration: 30% by mass), 20% by mass of self-dispersing magenta pigment dispersion (solid content concentration of pigment: 15% by mass), 20% by mass of 1,2-propanediol, 11% by mass of 1,3-propanediol (manufactured by Fujifilm Wako Pure Chemical Industries, Ltd.), 3% by mass of 1,2-butanediol (manufactured by Mitsubishi Chemical Corporation), 6% by mass of FS-300 (fluorine-based surfactant, manufactured by DuPont, solid content concentration of 40% by mass) as a surfactant, and 15% by mass of high-purity water were added and mixed and stirred to prepare a mixture.

Next, the obtained mixture was filtered through a polypropylene filter having an average pore size of 0.2 μm (trade name: BETAFINE polypropylene pleated filter PPG series, manufactured by 3M Co., Ltd.) to prepare Magenta Ink A.

Manufacturing Example 14

<Manufacturing of Color Ink B>

Color Ink B was prepared similarly to <Manufacturing of Color Ink A>, except that Resin Emulsion 1 in <Manufacturing of Color Ink A> above was changed to Resin Emulsion 2 (solid content concentration: 30% by mass), the content of FS-300 was changed to 4.5% by mass, and the content of high-purity water was changed to 16.5% by mass.

Manufacturing Example 15

<Manufacturing of Color Ink C>

Color Ink C was prepared similarly to <Manufacturing of Color Ink A>, except that Resin Emulsion 1 in <Manufacturing of Color Ink A> above was changed to 20% by mass of Resin Emulsion 4 (solid content concentration: 45% by mass), and the content of high-purity water was changed to 20% by mass.

Manufacturing Example 16

<Manufacturing of Color Ink D>

Color Ink D was prepared similarly to <Manufacturing of Color Ink A>, except that Resin Emulsion 1 in <Manufacturing of Color Ink A> above was changed to 20% by mass of Resin Emulsion 5 (solid content concentration: 45% by mass) and the content of high-purity water was changed to 20% by mass.

Example 1

<Inkjet Printing>

An ink cartridge in which Pretreatment Liquid A is filled in a black portion, Clear Ink A is filled in a cyan portion, and Color Ink A is filled in a magenta portion was mounted in an ink cartridge portion of an inkjet printer GXe5500 modified device (manufactured by Ricoh Co., Ltd.) to perform inkjet printing. The printing environment was an indoor environment adjusted to a temperature of 25° C.±0.5° C. and a RH of 50±5%. The modified device further included a heater (temperature adjustment controller, model: MTCD, manufactured by Misumi Inc.) so that the recording medium can be heated from the back side before printing, during printing, and after printing. Thus, it was possible to print on a recording medium heated by the heater before and during the printing, and to heat and dry the printed object by the heater after the printing.

—Impermeable Base Material—

A window film GIY0305 (a transparent polyethylene terephthalate (PET) film, manufactured by Lintec Sign Systems Co., Ltd.) was used as the impermeable base material.

—Printed Image—

First, a full solid image of the pretreatment liquid (cyan) was printed on the impermeable base material at an image resolution of 600 dpi×600 dpi and a print rate of 80% gradation. At this time, the heating temperatures of the heater before printing, during printing, and after printing were respectively set to 50° C., 90° C., and 70° C.

A full solid image of the color ink was further printed on the full solid image of the pretreatment liquid on the impermeable base material using the inkjet printer. At this time, the image resolution was 600 dpi×600 dpi, the print rate was 100% gradation, and the heating temperatures of the heater before printing, during printing, and after printing were respectively set to 40° C., 40° C., and 60° C.

A full solid image of the clear ink was further printed on the full solid image of the color ink on the impermeable base material using the inkjet printer. At this time, the image resolution was 600 dpi×600 dpi, the print rate was 100% gradation, and the heating temperatures of the heater before printing, during printing, and after printing were respectively set to 40° C., 40° C., and 60° C.

<Adhesiveness Test (Cross-cut Peeling Test)>

The solid part of the full solid image of the clear ink obtained in <Inkjet Printing> above was subjected to a cross-cut peeling test using an adhesive cloth tape (123LW-50 manufactured by Nichiban), and the number of remaining squares among 100 test squares was counted and evaluated based on the following evaluation criteria. "A" refers to a sample that is acceptable. The results are presented in Table 3.

[Evaluation Criteria]
A: The number of remaining squares was 90 or more and 100 or less
B: The number of remaining squares was 80 or more and less than 90
C: The number of remaining squares was less than 80

<Abrasion Resistance Test>

The impermeable base material on which the full solid image of the clear ink is printed, obtained in <Inkjet Printing> above, was placed in a JSPS-type wear tester (friction tester II type) (device name: dyed article friction fastness tester AR-2 (BC), manufactured by Intec Co., Ltd.), to perform abrasion tests at a load of 200 g with 100 reciprocations and a load of 500 g with 500 reciprocations by using a friction block having a contact part to which a white cotton fabric (JIS L 0803 compliant, attachable white fabric for color fastness test KANAKIN No. 3) is attached. After the test, the coating film was visually observed and evaluated according to the following evaluation criteria. Samples ranked "A" or higher are acceptable. The results are presented in Table 3.

AA: No traces of rubbing can be confirmed on the printed surface, and no color transfer of ink can be confirmed on the white cotton fabric
A: No traces of rubbing can be confirmed on the printed surface, but slight color transfer of ink can be confirmed on the white cotton fabric
B: Color change and gloss change of a rubbed portion of the printed surface can be confirmed from a distance of 30 cm, and slight color transfer of ink to the white cotton fabric can be confirmed
C: Color change and gloss change of the rubbed portion of the printed surface can be confirmed from a distance of 1 m, and color transfer of ink can be clearly confirmed on the white cotton fabric
D: A part of the impermeable medium is exposed Examples 2 to 15 and Comparative Examples 3 to 8

Inkjet printing was performed similarly to Example 1, except that Pretreatment Liquid A in Example 1 was changed to Pretreatment Liquids B to F, Color Ink A was changed to Color Inks B to D, and Clear Ink A was changed to Clear Inks B to F, and then, an adhesiveness test and an abrasion resistance test were performed. Table 3 illustrates a list of the liquids used in the Examples and Comparative Examples, resin types contained in the liquids, and details of the evaluation results.

Comparative Example 1

Inkjet printing was performed similarly to Example 1, except that printing by Clear Ink A of Example 1 was not performed, and then, an adhesiveness test and an abrasion resistance test were performed. Table 3 lists each of the liquids, the resin types contained in the liquids, and details of the evaluation results.

Comparative Example 2

Inkjet printing was performed similarly to Example 1, except that printing by the Pretreatment Liquid A of Example 1 was not performed, and then, an adhesiveness test and an abrasion resistance test were performed. Table 3 lists each of the liquids, resin types contained in the liquids, and details of the evaluation results.

TABLE 3

| | Resin Emulsions | | | | | | Evaluation | | |
| | Pretreatment Liquid | | Color ink | | Clear ink | | Adhesiveness | Abrasion resistance (JSPS wear) | |
| | No. | Resin type | No. | Resin type | No. | Resin type | (Cross-cut peeling test) | 200 g, 100 times | 500 g, 500 times |
|---|---|---|---|---|---|---|---|---|---|
| Example 1 | A | Urethane | A | Urethane | A | Urethane | A | AA | AA |
| Example 2 | A | Urethane | A | Urethane | B | Urethane | A | AA | AA |
| Example 3 | B | Urethane | A | Urethane | A | Urethane | A | AA | AA |
| Example 4 | C | Urethane | A | Urethane | A | Urethane | A | AA | A |
| Example 5 | A | Urethane | B | Urethane | A | Urethane | A | AA | A |
| Example 6 | A | Urethane | A | Urethane | C | Urethane | A | AA | A |
| Example 7 | C | Urethane | B | Urethane | A | Urethane | A | AA | A |
| Example 8 | C | Urethane | A | Urethane | C | Urethane | A | AA | A |
| Example 9 | A | Urethane | B | Urethane | C | Urethane | A | AA | A |
| Example 10 | C | Urethane | B | Urethane | C | Urethane | A | AA | A |
| Example 11 | D | Urethane | A | Urethane | D | Urethane | A | AA | A |
| Example 12 | E | Acrylic resin | C | Acrylic resin | E | Acrylic resin | A | A | A |

TABLE 3-continued

| | Resin Emulsions | | | | | | Evaluation | | |
| --- | --- | --- | --- | --- | --- | --- | --- | --- | --- |
| | | | | | | | | Abrasion resistance (JSPS wear) | |
| | Pretreatment Liquid | | Color ink | | Clear ink | | Adhesiveness | 200 g, | 500 g, |
| | No. | Resin type | No. | Resin type | No. | Resin type | (Cross-cut peeling test) | 100 times | 500 times |
| Example 13 | F | Acrylic resin | C | Acrylic resin | E | Acrylic resin | A | A | A |
| Example 14 | E | Acrylic resin | D | Acrylic resin | E | Acrylic resin | A | A | A |
| Example 15 | E | Acrylic resin | C | Acrylic resin | F | Acrylic resin | A | A | A |
| Comparative Example 1 | A | Urethane | A | Urethane | — | — | B | B | C |
| Comparative Example 2 | — | — | A | Urethane | A | Urethane | B | A | B |
| Comparative Example 3 | A | Urethane | A | Urethane | E | Acrylic resin | A | B | B |
| Comparative Example 4 | E | Acrylic resin | A | Urethane | A | Urethane | B | A | B |
| Comparative Example 5 | A | Urethane | C | Acrylic resin | A | Urethane | B | B | C |
| Comparative Example 6 | E | Acrylic resin | C | Acrylic resin | A | Urethane | B | A | B |
| Comparative Example 7 | A | Urethane | C | Acrylic resin | E | Acrylic resin | A | B | B |
| Comparative Example 8 | E | Acrylic resin | A | Urethane | E | Acrylic resin | B | A | B |

A comparison of "Examples 1 to 15" and "Comparative Examples 1 to 8" indicated that the resins contained in the pretreatment liquid, the color ink, and the clear ink have an identical type of bonding structure in the repeating unit of the molecules, and thus, good results were obtained both for the adhesiveness and the abrasion resistance. If the combination of the resin types was different, the results indicated that either the adhesiveness or the abrasion resistance was poor.

A comparison of "Examples 1 to 11" indicated that, when the three resins contained in the pretreatment liquid, the color ink, and the clear ink were all an identical type (urethane resin), even if the resin structures were different, good results were obtained both for the adhesiveness and the abrasion resistance.

A comparison of "Examples 12 to 15" indicated that, when the three resin types contained in the pretreatment liquid, the color ink, and the clear ink were all an identical type (acrylic resin), even if the resin structures were different, good results were obtained both for the adhesiveness and the abrasion resistance.

For example, aspects of the present embodiment include the following.

In a first aspect, an ink set includes a pretreatment liquid containing a resin (R1), a color ink containing a resin (R2), and a clear ink containing a resin (R3), in which the resin (R1), the resin (R2), and the resin (R3) have an identical type of bonding structure in a repeating unit of a molecule.

According to a second aspect, in the ink set according to the first aspect, the resin (R1), the resin (R2), and the resin (R3) all comprise a urethane resin or an acrylic resin.

According to a third aspect, in the ink set according to any one of the first aspect and the second aspect, the pretreatment liquid contains 1,2-propanediol.

According to a fourth aspect, in the ink set according to any one of the first to third aspects, the pretreatment liquid contains a polyvalent metal compound, and the polyvalent metal compound includes a calcium salt.

According to a fifth aspect, in the ink set according to any one of the first to fourth aspects, a dry film of the clear ink has a glass transition temperature (Tg) of 50° C. or more and less than 0° C.

According to a sixth aspect, in the ink set according to any one of the first to fifth aspects, the resin (R3) includes resin particles having a volume average particle diameter of nm or less.

According to a seventh aspect, in the ink set according to any one of the first to sixth aspects, the resin (R3) includes resin particles A having a glass transition temperature (Tg) of 50° C. or higher and resin particles B having a glass transition temperature (Tg) of less than 0° C.

According to an eighth aspect, in the ink set according to the seventh aspect, a mass ratio (MA:MB) between a mass MA (mg) of the resin particles A and a mass MB (mg) of the resin particles B is from 98:2 to 80:20.

According to a ninth aspect, in the ink set according to any one of the seventh aspect and the eighth aspect, the resin particles A comprise a urethane resin.

According to a tenth aspect, in the ink set according to any one of the first to ninth aspects, a proportion of the resin (R3) in the clear ink is 10% by mass or more.

According to an eleventh aspect, in the ink set according to any one of the first to tenth aspects, the clear ink contains a surfactant, and a proportion of the surfactant in the clear ink is 2% by mass or less.

In a twelfth aspect, an image forming method includes applying a pretreatment liquid containing a resin (R1) onto an impermeable base material, applying a color ink containing a resin (R2), and applying a clear ink containing a resin (R3), and the resin (R1), the resin (R2), and the resin (R3) have an identical type of bonding structure in a repeating unit of a molecule.

In a thirteenth aspect, an image forming apparatus includes a pretreatment liquid applicator to apply a pretreatment liquid containing a resin (R1) onto an impermeable base material, a color ink liquid applicator to apply a color ink containing a resin (R2), and a clear ink liquid applicator to apply a clear ink containing a resin (R3), and the resin (R1), the resin (R2), and the resin (R3) have an identical type of bonding structure in a repeating unit of a molecule.

According to the ink set for an impermeable base material described in any one of the first to eleventh aspects, the image forming method according to the twelfth aspect, and the image forming apparatus according to the thirteenth aspect, it is possible to solve various conventional problems described above and achieve the object of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An ink set, comprising:
   a pretreatment liquid containing a resin (R1);
   a color ink containing a resin (R2); and
   a clear ink containing a resin (R3),
   the resin (R1), the resin (R2), and the resin (R3) having an identical type of bonding structure in a repeating unit of a molecule.

2. The ink set according to claim 1, wherein the resin (R1), the resin (R2), and the resin (R3) all comprise a urethane resin or an acrylic resin.

3. The ink set according to claim 1, wherein the pretreatment liquid comprises 1,2-propanediol.

4. The ink set according to claim 1, wherein the pretreatment liquid contains a polyvalent metal compound, and the polyvalent metal compound includes a calcium salt.

5. The ink set according to claim 1, wherein a dry film of the clear ink has a glass transition temperature (Tg) of 50° C. or more and less than 0° C.

6. The ink set according to claim 1, wherein the resin (R3) includes resin particles having a volume average particle diameter of 50 nm or less.

7. The ink set according to claim 1, wherein the resin (R3) includes:
   resin particles A having a glass transition temperature (Tg) of 50° C. or higher; and
   resin particles B having a glass transition temperature (Tg) of less than 0° C.

8. The ink set according to claim 7, wherein a mass ratio (MA:MB) between a mass MA (mg) of the resin particles A and a mass MB (mg) of the resin particles B is from 98:2 to 80:20.

9. The ink set according to claim 7, wherein the resin particles A comprise a urethane resin.

10. The ink set according to claim 1, wherein a proportion of the resin (R3) in the clear ink is 10% by mass or more.

11. The ink set according to claim 1, wherein the clear ink includes a surfactant, and a proportion of the surfactant in the clear ink is 2% by mass or less.

12. An image forming apparatus comprising:
    a pretreatment liquid applicator to apply a pretreatment liquid containing a resin (R1) onto an impermeable base material;
    a color ink applicator to apply a color ink containing a resin (R2); and
    a clear ink applicator to apply a clear ink containing a resin (R3),
    the resin (R1), the resin (R2), and the resin (R3) having an identical type of bonding structure in a repeating unit of a molecule.

* * * * *